(12) United States Patent
Yokoi

(10) Patent No.: US 7,104,884 B2
(45) Date of Patent: Sep. 12, 2006

(54) BREEDING SIMULATION APPARATUS FOR VIRTUAL CREATURES

(75) Inventor: Akihiro Yokoi, Tokyo (JP)

(73) Assignees: Kabushiki Kaisha Bandai, Tokyo (JP); Kabushiki Kaisha Wiz, Tokyo (JP)

( * ) Notice: Subject to any disclaimer, the term of this patent is extended or adjusted under 35 U.S.C. 154(b) by 0 days.

(21) Appl. No.: 11/007,991

(22) Filed: Dec. 8, 2004

(65) Prior Publication Data

US 2005/0119037 A1    Jun. 2, 2005

Related U.S. Application Data

(63) Continuation of application No. 10/440,563, filed on May 16, 2003, now Pat. No. 6,832,955, which is a continuation of application No. 09/767,012, filed on Jan. 22, 2001, now abandoned, which is a continuation-in-part of application No. 08/803,197, filed on Feb. 19, 1997, now Pat. No. 6,213,871.

(51) Int. Cl.
    *A63F 9/24* (2006.01)
(52) U.S. Cl. .......................................................... 463/7
(58) Field of Classification Search .................... 463/2, 463/8, 30–32, 37, 40–43, 7, 9; 273/461; 345/952

See application file for complete search history.

(56) References Cited

U.S. PATENT DOCUMENTS

| | | | |
|---|---|---|---|
| 2,185,190 A | 11/1940 | Gorbea et al. | |
| 2,669,063 A | 2/1954 | Lang | |
| 3,641,703 A | 2/1972 | Tepper et al. | |
| 3,992,807 A | 11/1976 | Sapkus | |
| 4,869,701 A | 9/1989 | Kawai et al. | |
| 5,037,345 A | 8/1991 | Nakayama | |
| 5,048,831 A | 9/1991 | Sides | |
| 5,295,889 A | 3/1994 | Ejima | |
| 5,390,937 A | 2/1995 | Sakaguchi et al. | |
| 5,393,071 A | 2/1995 | Best | |
| 5,395,242 A | 3/1995 | Slye et al. | |
| 5,396,225 A | 3/1995 | Okada et al. | |
| 5,423,554 A | 6/1995 | Davis | |
| 5,443,388 A | 8/1995 | Jurmain et al. | |
| 5,462,275 A | 10/1995 | Lowe et al. | |

(Continued)

FOREIGN PATENT DOCUMENTS

EP        0 712074 A2      5/1996

(Continued)

OTHER PUBLICATIONS

"Creature", CyberLife, (Mindscape, Inc., 1997) pp. 14-15.*

(Continued)

*Primary Examiner*—Kim Nguyen
(74) *Attorney, Agent, or Firm*—Luce, Forward, Hamilton & Scripps LLP

(57) ABSTRACT

A simulation for breeding a virtual creature for growing the creature by a player by applying disciplining or training treatments to the creature in a screen. The apparatus is provided with mark display units individually displaying a plurality of kinds of treatments related to breeding the virtual creature and key switches for inputting a corresponding one of the treatments by selecting a specific mark from the plurality of marks. The apparatus includes a storing unit for storing control data related to breeding the virtual creature, a control unit whereby treatments for breeding the virtual creature are inputted by operating the key switches and a display unit for displaying the fostered virtual creature. Control data corresponding to input into the control unit is read from the storing unit and a control process related to breeding the virtual creature is conducted based on the read control data.

3 Claims, 13 Drawing Sheets

U.S. PATENT DOCUMENTS

| | | | |
|---|---|---|---|
| 5,511,158 A | 4/1996 | Sims | |
| 5,556,339 A | 9/1996 | Cohen | |
| 5,572,646 A * | 11/1996 | Kawai et al. | 345/501 |
| 5,580,308 A | 12/1996 | Nakamura | |
| 5,643,088 A | 7/1997 | Vaughn et al. | |
| 5,685,096 A | 11/1997 | Horiuchi | |
| 5,754,740 A | 5/1998 | Fukuoka et al. | |
| D397,728 S | 9/1998 | Yuen et al. | |
| D399,537 S | 10/1998 | Chi et al. | |
| D399,906 S | 10/1998 | Chi et al. | |
| 5,956,501 A | 9/1999 | Brown | |
| 5,966,526 A | 10/1999 | Yokoi | |
| 5,971,855 A | 10/1999 | Ng | |
| D416,291 S | 11/1999 | Sugino | |
| 5,982,390 A | 11/1999 | Stoneking et al. | |
| D418,551 S | 1/2000 | Kageyama et al. | |
| D419,209 S | 1/2000 | Hampton et al. | |
| 6,020,892 A | 2/2000 | Dillon | |
| D421,634 S | 3/2000 | Kageyama et al. | |
| D423,611 S | 4/2000 | Hampton et al. | |
| 6,048,209 A | 4/2000 | Bailey | |
| 6,056,618 A | 5/2000 | Larian | |
| D431,270 S | 9/2000 | Kawakita et al. | |
| 6,141,019 A | 10/2000 | Roseborough et al. | |
| 6,148,770 A | 11/2000 | Lin | |
| 6,149,490 A | 11/2000 | Hampton et al. | |
| 6,165,068 A | 12/2000 | Sonoda et al. | |
| 6,167,362 A | 12/2000 | Brown et al. | |
| 6,171,189 B1 | 1/2001 | Katano et al. | |
| 6,175,857 B1 | 1/2001 | Hachiya et al. | |
| 6,213,871 B1 | 4/2001 | Yokoi | |
| 6,227,966 B1 | 5/2001 | Yokoi | |

FOREIGN PATENT DOCUMENTS

| | | |
|---|---|---|
| EP | 0 712074 A3 | 4/1997 |
| JP | 58-153985 | 9/1983 |
| JP | 05-189403 | 7/1993 |
| JP | 06-154420 | 6/1994 |
| JP | 06-198076 | 7/1994 |
| JP | 06-277265 | 10/1994 |
| JP | 07-98104 | 10/1995 |
| JP | 07-98105 | 10/1995 |
| JP | 07-98106 | 10/1995 |
| JP | 07-261962 | 10/1995 |
| JP | 07-281819 | 10/1995 |
| JP | 07-325689 | 12/1995 |
| JP | 2529573 | 6/1996 |
| JP | 08-309032 | 11/1996 |

OTHER PUBLICATIONS

"Auquazone Desktop Virtual Reality User's Guide", Lits Computer & 9003 Inc., (1993) pp. 1-70.

Michael Bremer, "Sim Life User's Manual ", Maxis, (1992) pp. 5-204.

"Princess Maker Game Manual ", Login, No. 5, Mar. 1, 1991.

Christopher Pöppe, "Mathematical Entertainment ", (1996) pp. 1-12.

Thomas Feibel, "Weird Creatures", Report: Games vol. 2, (1997) pp. 76-80.

Kevin Sullivan, "A Chicken in Every Pocket", Washington Post Foreign Service, Jan. 25, 1997. p. A01.

"Love Eggs", Tomorrow's Technology Today, Future Publishing Ltd., No. 8 (Jun., 1997) p. 83.

"Creatures", Personal Computer World, (VNU Business Publications, London, UK) Feb. 1, 1997, pp. 96.

"Creatures", CyberLife (Mindscape Inc., 1997) pp. 14-15.

* cited by examiner

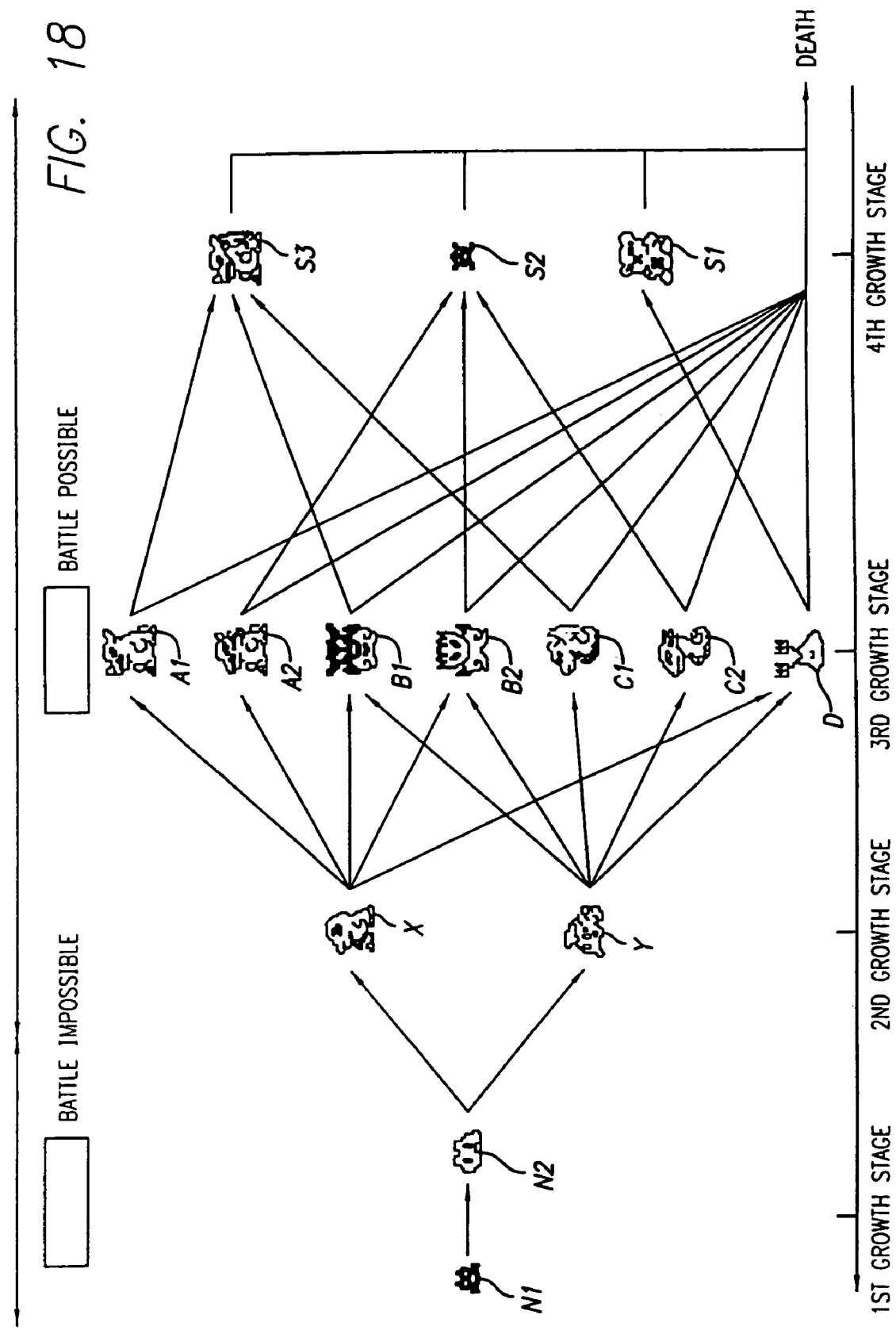

BREEDING SIMULATION APPARATUS FOR VIRTUAL CREATURES

CROSS-REFERENCE TO RELATED APPLICATIONS

The present application is a Continuation of U.S. patent application Ser. No. 10/440,563, filed May 16, 2003, issued as U.S. Pat. No. 6,832,955 on Dec. 21, 2004, which is a Continuation of U.S. patent application Ser. No. 09/767,012, filed on Jan. 22, 2001, abandoned which is a Continuation-in-Part of U.S. patent application Ser. No. 08/803,197, issued as U.S. Pat. No. 6,213,871 on Apr. 10, 2001, the contents of which are incorporated herein by reference.

BACKGROUND OF THE INVENTION

1. Field of the Invention

The present invention relates to a simulation apparatus for breeding a virtual creature by performing a treatment in respect of a call from the virtual creature, or even if there is no call or request from the virtual creature, by a player voluntarily taking care of the virtual creature.

2. Description of Related Art

In recent years, various electronic game apparatuses for raising a pet such as a dog or a cat in a predetermined screen, have been proposed and sold. There have been known conventional electronic game apparatuses of this kind disclosed in, for example, Japanese Unexamined Patent Publication No. JP-A-7-261962 or Japanese Unexamined Patent Publication No. JP-A-7-281819.

According to a conventional example disclosed in Japanese Unexamined Patent Publication No. JP-A-7-261962, a light emitting element and a light receiving element are installed to a main body of an apparatus and infrared ray emitted from the light emitting element is reflected by hand or the like and received by the light receiving element by noncontact operation of a user (player)-Further, data of a plurality of patterns of dog characters and biorhythms of dog characters are stored in a memory and accordingly, data of the dog characters in correspondence with a number of times of the noncontact operation and a biorhythm of the day are selectively read from the memory and are displayed. Thereby, a character image in correspondence with physical condition of the dog character can be selectively displayed.

According to the conventional example disclosed in Japanese Unexamined Patent Publication No. JP-A-7-28189, a light emitting element and a light receiving element are installed to a main body of an apparatus and infrared ray from the light emitting element is reflected by hand or the like and received by the light receiving element by noncontact operation of a user by which a noncontact operation distance is detected. Further, a plurality of kinds of dog character data where motion of a dog is changed such as a looking-back dog or a paw-raising dog or the like and effective sound data are stored in a memory and accordingly, the dog character data are selectively read and displayed in correspondence with the noncontact operation distance and the effective sound thereof is emitted from a speaker. In this way, the character image in compliance with a gesticular order by the hand of the user can selectively displayed.

However, according to both of the above-described conventional examples, instruction is issued to a character image by a unilateral order from the user and there has been no example where a player breeds a creature taking the state of the character image into consideration.

SUMMARY OF THE INVENTION

The present invention has been devised in view of the above drawbacks and it is an object of the present invention to provide a simulation apparatus for breeding a virtual creature where a player responds to call or request from a virtual creature in a screen and conducts treatment in correspondence thereto, or even if there is no call or request from the virtual creature, a player voluntarily takes care of the virtual creature, by which the virtual creature is disciplined or the virtual creature is grown while performing a training thereby breeding the virtual creature.

According to a first aspect of the present invention, there is provided a simulation apparatus for breeding a virtual creature where the following conditions are provided to achieve the above-described object.

That is, the present invention is constituted by:

(a) provision of inputting means for inputting treatments in respect of breeding a virtual creature;

(b) provision of a storing unit for storing control data in respect of breeding the virtual creature;

(c) provision of a control unit for conducting a control treatment in respect of breeding the virtual creature based on the read control data by reading a corresponding control data from the storing unit when a treatment in respect of breeding the virtual creature is inputted from the inputting means;

(d) provision of a virtual creature display unit for displaying the fostered virtual creature;

(e) the control unit is provided with a setting means for setting 1 or more of growth stages in accordance with growth of the virtual creature;

(f) the storing unit stores a plurality of kinds of virtual creatures having at least different appearances in respect of each of the growth stages;

(g) the control unit is provided with determining means for determining the contents of the treatments in respect of breeding the virtual creature in the growth procedure until then when virtual creature reaches one of the growth stages;

(h) the control unit is provided with selecting means for selecting one virtual creature from the plurality of kinds of virtual creatures stored based on a result of determination by the determining means; and (i) the control means is provided with changing means for changing the virtual creature which has reached one of the growth stages to the selected virtual creature.

According to a second aspect of the present invention, there is provided a simulation apparatus for breeding a virtual creature where the following conditions are added to the above-described first aspect of the present invention.

That is, the present invention further includes the following conditions:

(a) the storing unit stores a plurality of kinds of virtual creatures having different appearances and personalities at each of the growth stages;

(b) the inputting means is provided with a means for taking care of the virtual creature with the content necessary for growing the virtual creature and a means for conducting a discipline; and (c) the determining means determines a degree of care and a degree of discipline.

According to the third aspect of the present invention, there is provided a simulation apparatus for breeding a virtual creature having the following conditions.

That is, the present invention comprises:

(a) provision of inputting means for inputting treatments in respect of breeding a virtual creature;

(b) provision of a storing unit for storing control data in respect of breeding the virtual creature;

(c) provision of a control unit for conducting a control treatment in respect of breeding the virtual creature based on the read control data by reading a corresponding control data when a treatment in respect of breeding the virtual creature is inputted from inputting means;

(d) provision of a virtual creature displaying unit for displaying the fostered virtual creature;

(e) the control unit is provided with setting means for setting 1 or more of growth stages in accordance with growth of the virtual creature;

(f) the storing unit stores a plurality of kinds of virtual creatures having at least different appearances at each of the growth stages;

(g) the control unit is provided with determining means for determining the contents of the treatments in respect of breeding the virtual creature in a growth procedure until then when the virtual creature reaches one of the growth stages;

(h) the control unit is provided with selecting means for selecting one virtual creature from the plurality of kinds of stored virtual creatures based on a result of determination by the determining means;

(i) the control unit is provided with changing means for changing the virtual creature which has reached the one of the growth stages into a selected virtual creature;

(j) provision of connecting means for electrically connecting to other simulation apparatus for breeding a virtual creature;

(k) provision of warring means for conducting a war based on battle data from the other simulation apparatus for breeding a virtual creature inputted via the connecting means and battle data from the simulation apparatus for breeding a virtual creature of its own; and (l) the control unit is provided with win or lose determining means for determining win or lose of the war.

According to a fourth aspect of the present invention, there is provided a simulation apparatus for breeding a virtual creature having the following conditions in addition to the conditions of the above-described fourth aspect. That is, the present invention further includes the following conditions:

(a) the storing unit stores a plurality of kinds of virtual creatures having different appearances and powers at each of the growth stages;

(b) the inputting means is provided with a means for taking care of the virtual creature with the content necessary for growing virtual creature and a means for conducting a training with the content necessary for promoting the power; and (c) the determining means determines a degree of the care and a degree of the training.

BRIEF DESCRIPTION OF THE DRAWINGS

FIG. 18 is an explanatory view showing branches of character images in the simulation apparatus for breeding a virtual creature illustrated by FIG. 12.

DETAILED DESCRIPTION OF THE PREFERRED EMBODIMENTS

An explanation will be given of an example of an embodiment of a simulation apparatus for breeding a virtual creature in accordance with the present invention in reference to the drawings.

Figure 1:
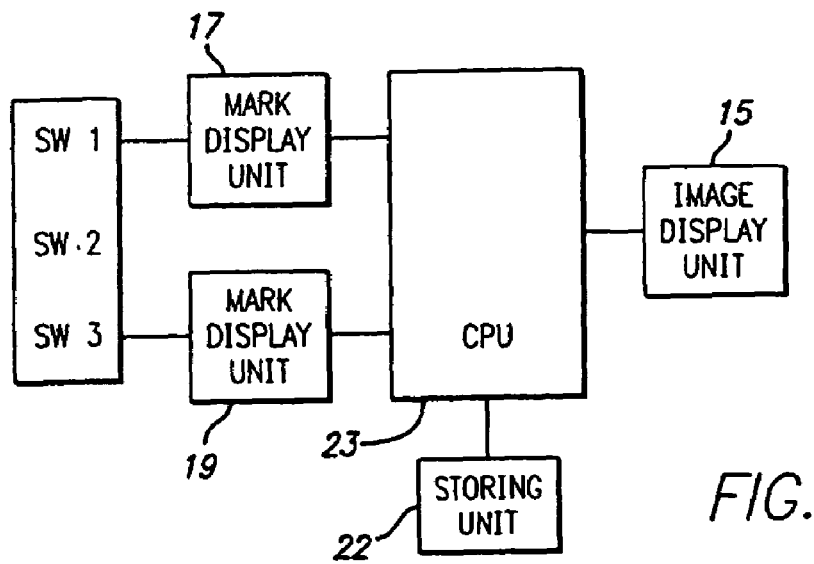
FIG. 1 is a block diagram of essential portions of a simulation apparatus for breeding a virtual creature according to the present invention.
Figure 2:
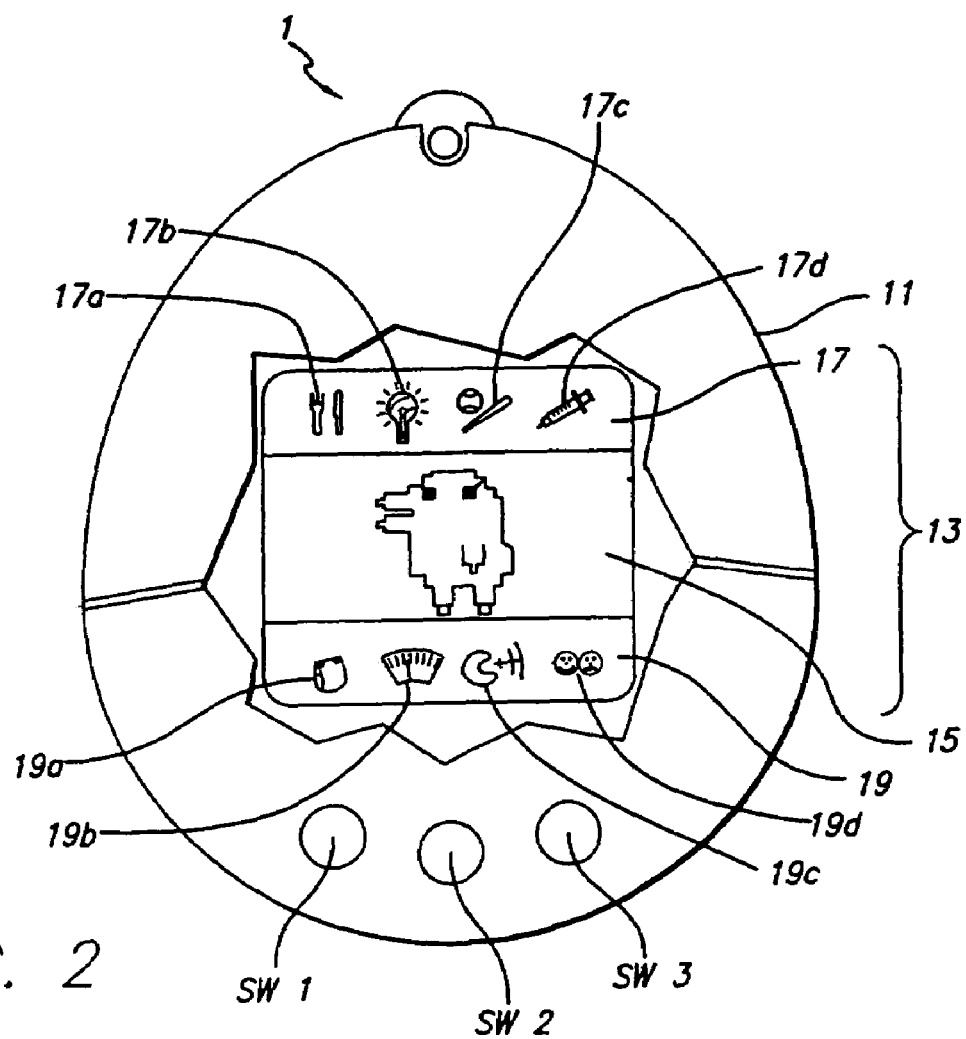
FIG. 2 is a plane view of a simulation apparatus for breeding a virtual creature according to the present invention.

As illustrated by FIG. 1 and FIG. 2, a simulation apparatus 1 for breeding a virtual creature according to this application, includes mark display units 17 and 19 each for displaying a plurality of kinds of treatments in respect of breeding a virtual creature individually by marks. A plurality of marks of a food mark 17a, an illumination mark 17b, a game mark 17c and an injection mark 17d are displayed in the mark display unit 17. Also, a plurality of marks of a rest room mark 19a, a check meter mark 19b, a discipline mark 19c and a call mark 19d are displayed in the mark display unit 19.

Key switches SW1, SW2 and SW3 installed at the lower side of the mark display unit 19, are switches for conducting treatments in respect of breeding a virtual creature, which constitute inputting means for inputting a corresponding treatment by selecting a specific one from the plurality of marks.

The key switch SW1 is a switch for selectively displaying a desired mark from the mark display units 17 and 19 and at every time of pushing down the key switch SW1, the food mark 17a, the illumination mark 17b, the game mark 17c, the injection mark 17d, the rest room mark 19a, the check meter mark 19b and the discipline mark 19c are switched and displayed in this order. The key switch SW2 is a switch for finally determining a selected mark and the key switch SW3 is a switch for canceling a displayed mark.

When, for example, the food mark 17a is selected by operating the key switches SW1, SW2 and SW3, meal or sweet can be given to the virtual creature. When the illumination mark 17b is selected, illumination of a room can be put off when the virtual creature takes a sleep. When the game mark 17c is selected, the user can play the game with the virtual creature. When the injection mark 17d is selectively displayed, an injection can be administered if the virtual creature gets ill. Thereby, the virtual creature can be treated. When the rest room mark 19a is selected, if the virtual creature evacuate droppings, they can be cleaned by flushing water. When the check meter mark 19b is selected, respective values of age, weight, humor parameter, hungriness parameter and discipline degree of the virtual creature can be confirmed in a meter display. When the discipline mark 19c is selected, a discipline can be conducted with respect to the virtual creature.

Naturally, a treatment other than the above-described may be displayed by a mark and the mark may be inputted by the key switches SW1, SW2 and SW3.

An apparatus main body 11 includes a storing unit 22 for storing control data in respect of breeding the virtual creature. The apparatus includes a control unit (CPU 23) where, when a treatment in respect of breeding the virtual creature is inputted by operating inputting means, the control data in correspondence thereto is read from storing unit 22 and a control treatment in respect of breeding the virtual creature is conducted based on the read control data. An image display unit 15 is installed at the front face of the apparatus main body 11 and the image display unit 15 is a virtual creature display unit for displaying the fostered virtual creature.

Incidentally, when the simulation apparatus 1 for breeding a virtual creature is small-sized, for example, the apparatus is formed compactly such that it is portable, ROM, EEPROM, SPAN or the like is installed fixedly or attachably and detachably as the above-described storing unit 22.

Or, when the simulation apparatus 1 for breeding a virtual creature is large-sized, for example, when the apparatus is integrated into a personal computer system, a pertinent record medium, for example, CD-ROM, CD-R, magnetic disk, photomagnetic disk, DVD or the like is used as the storing unit 22.

The simulation apparatus 1 for breeding a virtual creature according to the first aspect of the present invention, includes a setting means for setting 1 or more of growth stages in accordance with growth of the virtual creature. The setting means is installed in a control apparatus 21 shown by FIG. 4.

Figure 11:
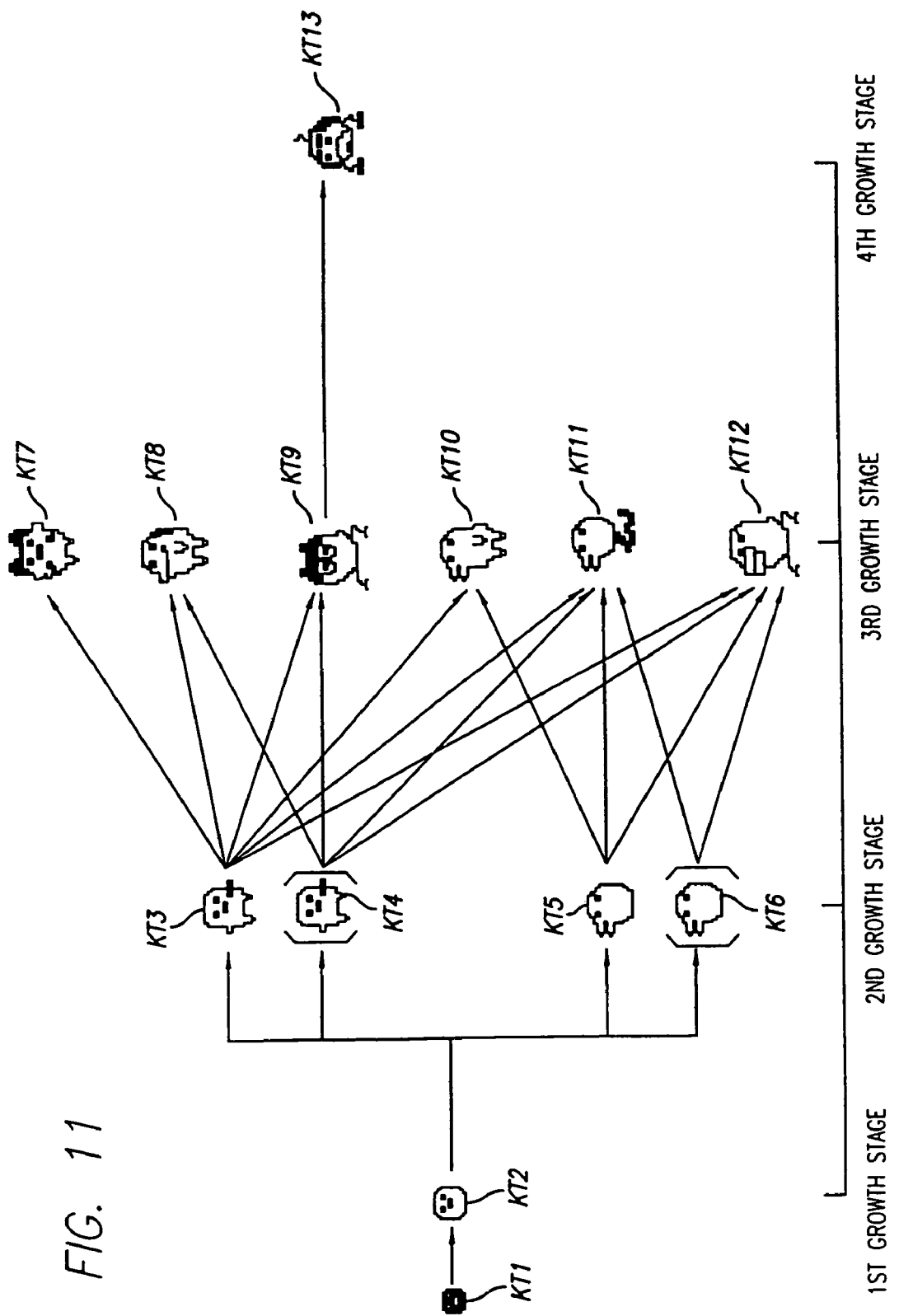
FIG. 11 is an explanatory view showing branches of character images in the simulation apparatus for breeding a virtual creature of FIG. 2.

As illustrated by FIG. 11, when a virtual creature having a first character image KT1 of a first generation is grown and reaches a first growth stage, it changes into a virtual creature of a character image KT2 of a second generation. Further, when the virtual creature is grown and reaches a second growth stage, the virtual creature of the character image KT2 of the second generation is changed into a virtual creature of either of character images KT3, KT4, KT5 and KT6 of a third generation. Further, when the virtual creature is grown and reaches a third growth stage, the virtual creature of the character image of the third generation is changed into a virtual creature of either of character images KT7 through KT12 of a fourth generation. Furthermore, the virtual creature is changed into a virtual creature of a character image KT13 of a fifth generation with a certain probability.

Therefore, according to the example illustrated by FIG. 11, four kinds of the growth stages of the first growth stage, the second growth stage, the third growth stage and the fourth growth stage are set.

Here, the program is set such that the virtual creature reaches the first growth stage after, for example, 60 minutes have elapsed since the virtual creature of the character image KT1 of the first generation was born and a virtual creature of a certain character image is set to reach the second growth stage after, for example, 23 hours have elapsed from the first growth stage. Further, a virtual creature of a certain character image is set to reach the third growth stage after, for example, 4 days have elapsed from the second growth stage and a virtual creature of a certain character image is set to reach the fourth growth stage, for example, 6 days have elapsed from the third growth stage. In this way, time periods required for the virtual creature to reach the growth stages, can be set to pertinent time periods which differ depending on the respective character image.

Incidentally, although 4 kinds of the growth stages are set in the example illustrated by FIG. 11, the present invention is not limited thereto but a single growth stage or growth stages of an arbitrary number of 5 or more may be set.

Also, a plurality of kinds of the virtual creatures having at least different appearances in respect of each of the growth stages, are stored in the storing unit 22. For example, as illustrated by FIG. 11, the virtual creatures of 4 kinds of the character images KT3, KT4, KT5 and KT6 having different appearances are stored as the virtual creatures of the third generation. Also, the virtual creatures having 6 kinds of the character images KT7 through KT12 respectively having different appearances are stored in the third growth stage as the virtual creatures of the fourth generation. A pertinent memory apparatus of ROM, SRAN, EEPROM, CDROM, RAN or the like is fixedly, or attachably and detachably installed as the storing unit 22.

That is, when the simulation apparatus 1 for breeding a virtual creature is small-sized, for example, when it is formed compactly such that it is portable, RCM, EEPROM, SPAN or the like is fixedly or attachably and detachably installed as the above-described storing unit 22. Also, when the simulation apparatus 1 for breeding a virtual creature is large-sized, for example, when it is integrated into a personal computer system, a pertinent record medium, for example, CD-ROM, CD-R, magnetic disk, photomagnetic disk, DVD or the like is used as the storing unit 22.

Incidentally, although one kind of a character image is stored at each of the first growth stage and the fourth growth stage in the example illustrated by FIG. 11, the present invention is not limited thereto but a plurality of kinds of grown virtual creatures may be stored for each of them.

Also, the key switches SW1, SW2 and SW3 are provided as inputting means for conducting a treatment in respect of breeding the virtual creature. Pertinent switches or noncontact type switches may be used as the inputting means.

The apparatus is provided with determining means for determining the contents of treatments in respect of breeding a virtual creature in the growth stages until then when the virtual creature reaches a certain growth stage and selecting means for selecting one grown virtual creature from a plurality of kinds of virtual creatures in consideration of a result of determination by the determining means. The selecting means, for example, selects one grown virtual creature from a plurality of kinds of virtual creatures in accordance with a number of times of feeding the virtual creature.

Figure 4:
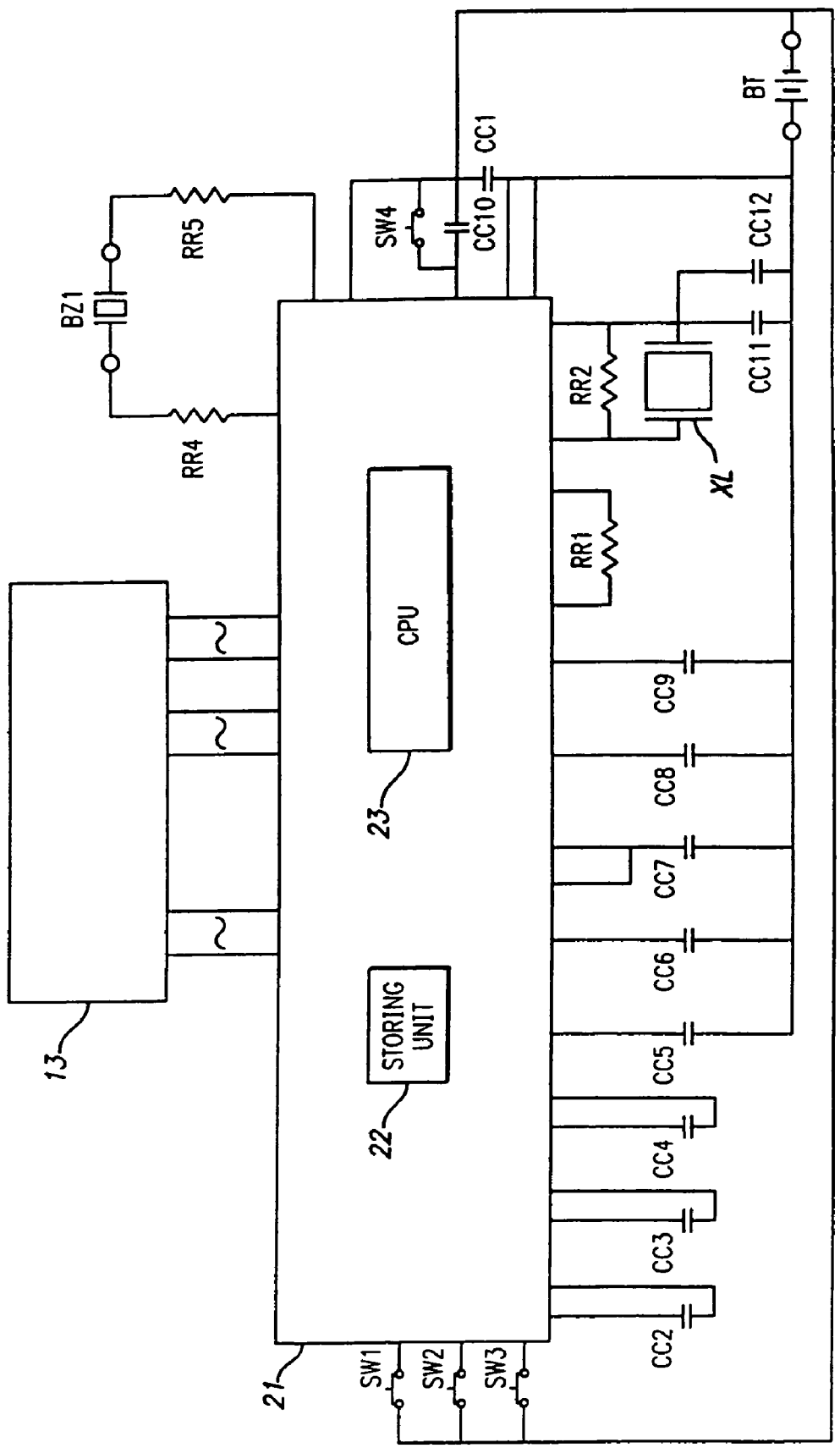
FIG. 4 is a circuit diagram of the simulation apparatus for breeding a virtual creature of FIG. 2.

The determining means and the selecting means are installed in the control apparatus 21 illustrated by FIG. 4.

Next, an explanation will be given of an embodiment of the simulation apparatus 1 for breeding a virtual creature in accordance with the second aspect of the present invention. A plurality of kinds of grown virtual creatures having different appearances and personalities, are stored in the storing unit 22 at each of the growth stages.

For example, as illustrated by FIG. 11, the virtual creatures of 4 kinds of the character images KT3, KT4, KT5 and KT6 respectively having different appearances and personalities are stored as the virtual creatures of the third generation at the second growth stage. The virtual creature of the character image KT3 has a disposition of being hard to get ill although it has a little selfish personality. The virtual creature of the character image KT4 has a disposition of being hard to get ill although it has a very selfish personality. The virtual creature of the character image KT5 has a disposition of being liable to get ill and it has a little selfish personality. The virtual creature of the character image KT6 has a disposition of being liable to get ill with a very selfish personality. Further, other than these, each character image is set with a rise time, a retire time, a time period of one generation, a frequency of calls, a number of times of injection against illness, a minimum weight and the like.

Further, the virtual creatures of 6 kinds of character images KT7 through KT12 respectively having different appearances and personalities are stored as the virtual creatures of the fourth generation at the third growth stage. As described above, whether the virtual creature has a selfish personality, whether the virtual creature has a disposition of being liable to get ill, a rise time, a retire time, a time period in one generation, a frequency of calls, a number of times of injection against illness, a minimum weight and the like are set to each of the character images. A pertinent memory apparatus such as ROM, SEAN, EEPROM, CD-ROM, RAN or the like is fixedly or attachably and detachably installed as the storing unit 22.

The apparatus is provided with inputting means for conducting a treatment in respect of breeding a virtual creature. The inputting means has a means for taking care of a virtual creature with a content necessary for growing a virtual creature and a means for conducting a discipline.

For example, a player can prepare a meal with a content necessary for growing a virtual creature, play a game or put off illumination by operating the key switches SW1, SW2 and SW3. Also, the player can conduct a discipline by selectively displaying the discipline mark 19c by operating the key switches SW1, SW2 and SW3 in respect of a selfish content from a virtual creature.

When a virtual creature reaches a certain growth stage, the apparatus determines the contents of treatments in respect of breeding the virtual creature during the growth procedure until then, that is, the contents of cares and disciplines by the determining means and selects one grown virtual creature from a plurality of kinds of virtual creatures in consideration of a result of determination by the determining means, by using selecting means. Accordingly, when a player diligently takes care of the virtual creature and conducts pertinent discipline therefor, a virtual creature having a good personality is selected from the plurality of kinds of virtual creatures and accordingly, much care is not needed thereafter.

Conversely, when the player does not diligently take care of a virtual creature and does not conduct a discipline therefor, a virtual creature having a bad personality is selected from the plurality of kinds of virtual creatures and accordingly, a number of calls from the virtual creature is increased thereafter and the burden on the player becomes heavy.

Figure 12:
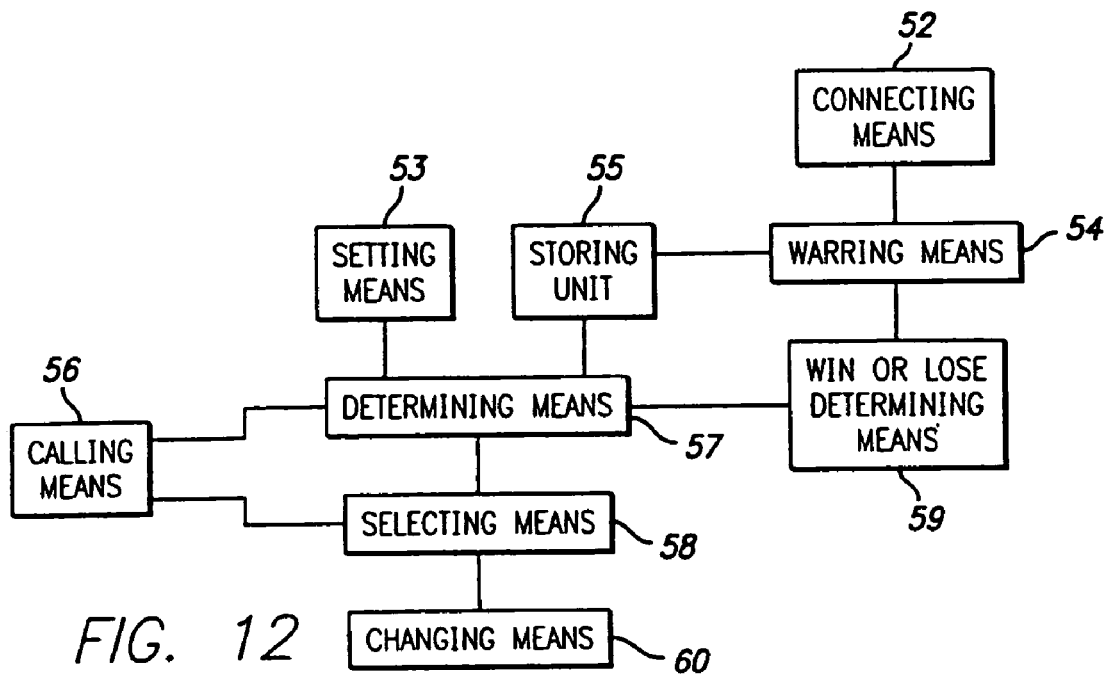
FIG. 12 is a block diagram of essential portions of a simulation apparatus for breeding a virtual creature according to other embodiment of the present invention.

Next, an explanation will be given of an embodiment of a simulation apparatus for breeding a virtual creature according to the third aspect of the present invention. As illustrated by FIG. 12, the simulation apparatus for breeding a virtual creature according to the third aspect of the present invention, is provided with setting means 53 for setting 1 or more of growth stages in accordance with growth of a virtual creature. For example, as shown by FIG. 18, when a virtual creature of a character image N1 of a first generation is grown and reaches a first growth stage, it changes into a virtual creature of a character image N2 of a second generation. Further, when the virtual creature is grown and reaches a second growth stage, the virtual creature of the character image N2 of the second generation is changed into either of virtual creatures of character images X and Y of a third generation. Furthermore, when the virtual creature is grown and reaches a third growth stage, the virtual creature of the character image of the third generation is changed into either of virtual creatures of character images A1, A2, E1, B2, C1, C2 and D of the fourth generation. When the virtual creature reaches a fourth growth stage, the virtual creature of the character image of the fourth generation is changed into either of virtual creatures of character images S1, S2 and S3 of a fifth generation.

Accordingly, 4 kinds of growth stages of the first growth stage, the second growth stage, the third growth stage and the fourth growth stage are set in the example illustrated by FIG. 18.

Here, the apparatus is set such that the virtual creature of the character image N1 of the first generation reaches the first growth stage after, for example, 60 minutes have elapsed since the virtual creature of the character image N1 was born and a virtual creature of a certain character image reaches the second growth stage from the first growth stage after, for example, 47 hours have elapsed. Also, the apparatus is set such that a virtual creature of a certain character image reaches a third growth stage after, for example, 3 days have elapsed from the second growth stage and a virtual creature of a certain character image reaches a fourth growth stage after, for example, 5 days have elapsed from the third growth stage. In this way, arbitrary time periods which differ depending on the respective character images, can be set for time periods required for a virtual creature to reach the growth stages.

Incidentally, although 4 kinds of the growth stages are set in the example of FIG. 18, the present invention is not limited thereto but a single growth stage or growth stages of 5 or more may be set.

The apparatus is provided with a storing unit 55 for storing a plurality of kinds of grown virtual creatures having different appearances at each of the growth stages. For example, as illustrated by FIG. 18, the virtual creatures of 2 kinds of the character images X and Y respectively having different appearances are stored as the virtual creatures of the third generation at the second growth stage. The virtual creatures of 7 kinds of the character images A1, A2, E1, E2, C1, C2 and D respectively having different appearances are stored as the virtual creatures of the fourth generation at the third growth stage. The virtual creatures of 3 kinds of character images S1, S2 and S3 are stored as the virtual creatures of the fifth generation at the fourth growth stage. A pertinent memory apparatus of ROM, SRAN, EEPROM, CD-ROM, RAN or the like is fixedly or attachably and detachably installed as the storing unit 55.

Incidentally, although 1 kind of the character image is stored at the first growth stage in the example of FIG. 18, the present invention is not limited thereto but a plurality of kinds of grown virtual creatures may be stored.

Also the apparatus is provided with inputting means for conducting a treatment in respect of breeding the virtual creature. As the inputting means, pertinent switches of the key switches SW1, SW2 and SW3 or the like or noncontact type switches are used.

The apparatus is provided with determining means 57 for determining the contents of treatments in respect of breeding the virtual creature in the procedure of growth until then when the virtual creature reaches a certain growth stage and selecting means 58 for selecting one grown virtual creature from a plurality of kinds of virtual creatures in consideration of a result of determination by the determining means 57. One virtual creature is selected from a plurality of kinds of virtual creatures, by the function of the determining means 57 and the selecting means 58, in accordance with a number of times of serving meals to the virtual creature. The apparatus is provided with changing means 60 for changing the virtual creature to a selected virtual creature when the virtual creature is grown and reaches the above-descried growth stage.

The apparatus is also provided with connecting means 52 for electrically connecting to other simulation apparatus for breeding a virtual creature. As the connecting means 52, a system of fittedly connecting the both simulation apparatuses, a system of connecting the both simulation apparatuses by simply bringing them in contact with each other, a system of connecting the both by connectors or the like is adopted.

The apparatus is also provided with warring means 54 for making a war based on battle data from the other simulation apparatus inputted via the above-described connecting means and battle data of the simulation apparatus of its own and win or lose determining means 59 for determining win or lose of the war.

Figure 15:
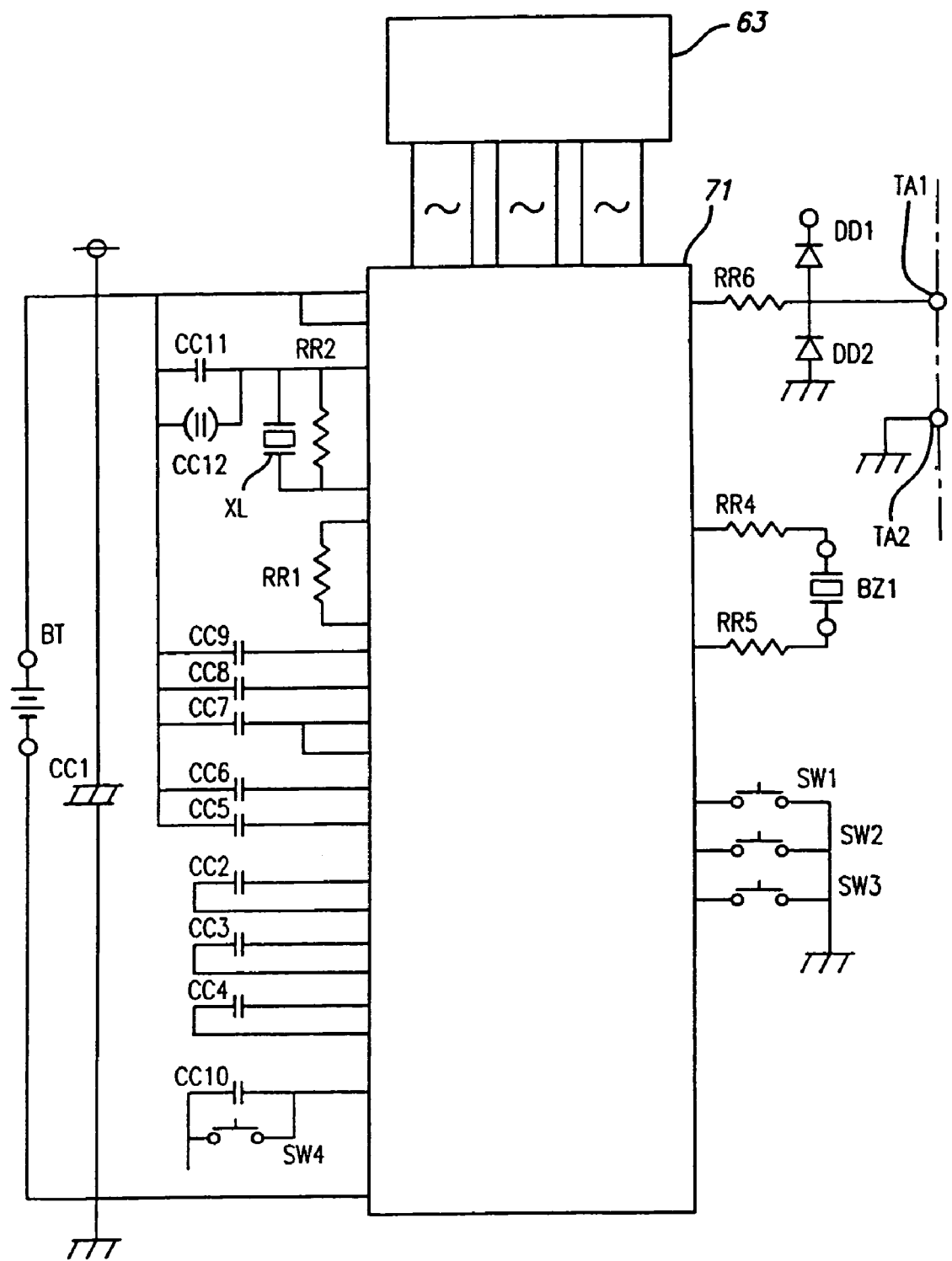
FIG. 15 is a circuit diagram of the simulation apparatus for breeding a virtual creature illustrated by FIG. 12.

The setting means 53, the storing means 55, the determining means 57, the selecting means 58, the changing means 60, the warring means 54 and the win or lose determining means 59 are installed in a control apparatus 71 illustrated by FIG. 15.

Next, an explanation will be given of an embodiment of a simulation apparatus for breeding a virtual creature according to the fourth aspect of the present invention.

The apparatus is provided with a storing unit 55 for storing a plurality of kinds of grown virtual creatures having different appearances and powers (rates of win) at each of growth stages.

Figure 19:
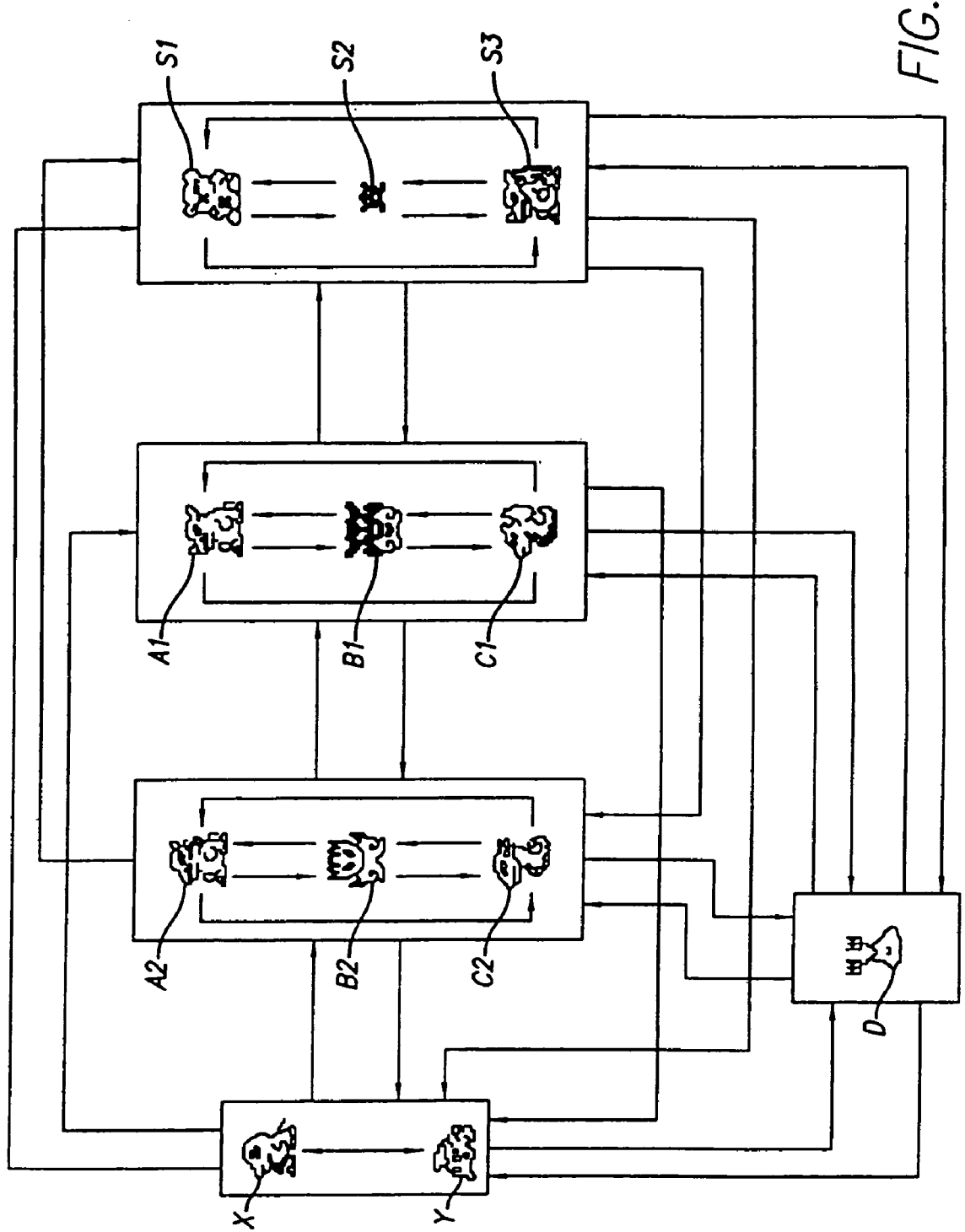
FIG. 19 is an explanatory view in a warring operation in the simulation apparatus for breeding a virtual creature illustrated by FIG. 12.

For example, as illustrated by FIG. 19, virtual creatures of character images A2, E2 and C2 have a rate of win of 80% in respect of virtual creatures of character images X and Y and a rate of win of 30% in respect of virtual creatures of character images A1, E1 and C1. Further, the virtual creatures of the character images A1, E1 and C1 have a rate of win of 70% in respect of the virtual creatures of the character images A2, B2 and C2 and a rate of win of 20% in respect of virtual creatures of character images S1, S2 and S3.

Further, a virtual creature of a character image D has a rate of win of 60% in respect of the virtual creatures of the character images X and Y, a rate of win of 30% in respect of the virtual creatures of the character images A2, B2 and C2, a rate of win of 20% in respect of the virtual creatures of the character images A1, E1 and C1, and a rate of win of 5% in respect of the character images S1, S2 and S3. As the storing unit 55, a pertinent memory apparatus of ROM, SPAN, EEPROM, CD-ROM, RAM or the like is used.

The apparatus is also provided with inputting means for conducting a treatment in respect of breeding a virtual creature. Further, the inputting means is provided with a means for taking care of the virtual creature with the content necessary for growing the virtual creature, and a means for conducting a training with the content necessary for promoting a power.

For example, a player can feed food or put off illumination by operating the key switches SW1, SW2 and SW3 in respect of the content necessary for growing the virtual creature. Also, the player can conducts a training by selectively displaying the training mark 67c by operating the key switches SW1, SW2 and SW3 in respect of the content necessary for promoting a power.

When the virtual creature reaches a certain growth stage, the contents of treatments in respect of breeding a virtual creature in the growth procedure until then, that is, the contents of cares and trainings are determined by the determining means 58 and one grown virtual creature is selected by selecting means 57 from a plurality of kinds of virtual creatures in consideration of a result of determination. Accordingly, when a player diligently takes care of the virtual creature and conducts a training of the virtual creature pertinently, a virtual creature having a high initial value of a power is selected from a plurality of kinds of virtual creatures.

Next, an explanation will be given of an embodiment of a simulation apparatus 1 for breeding a virtual creature according to the present invention in reference to FIGS. 1 through 11 as follows.

Figure 3:
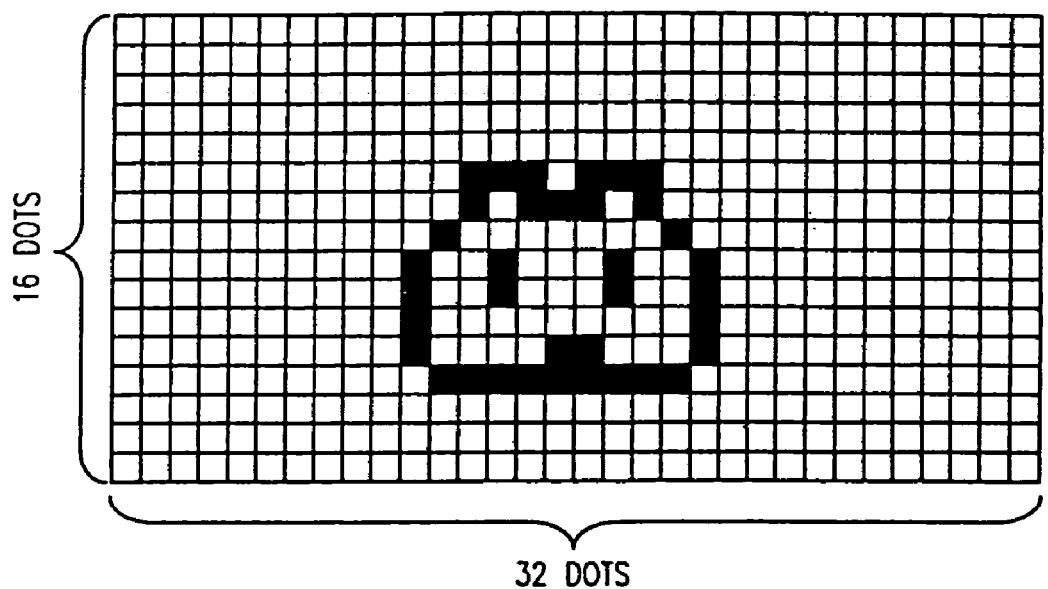
FIG. 3 is an explanatory view showing an example of a liquid crystal screen of a display unit in FIG. 2.
Figure 7:
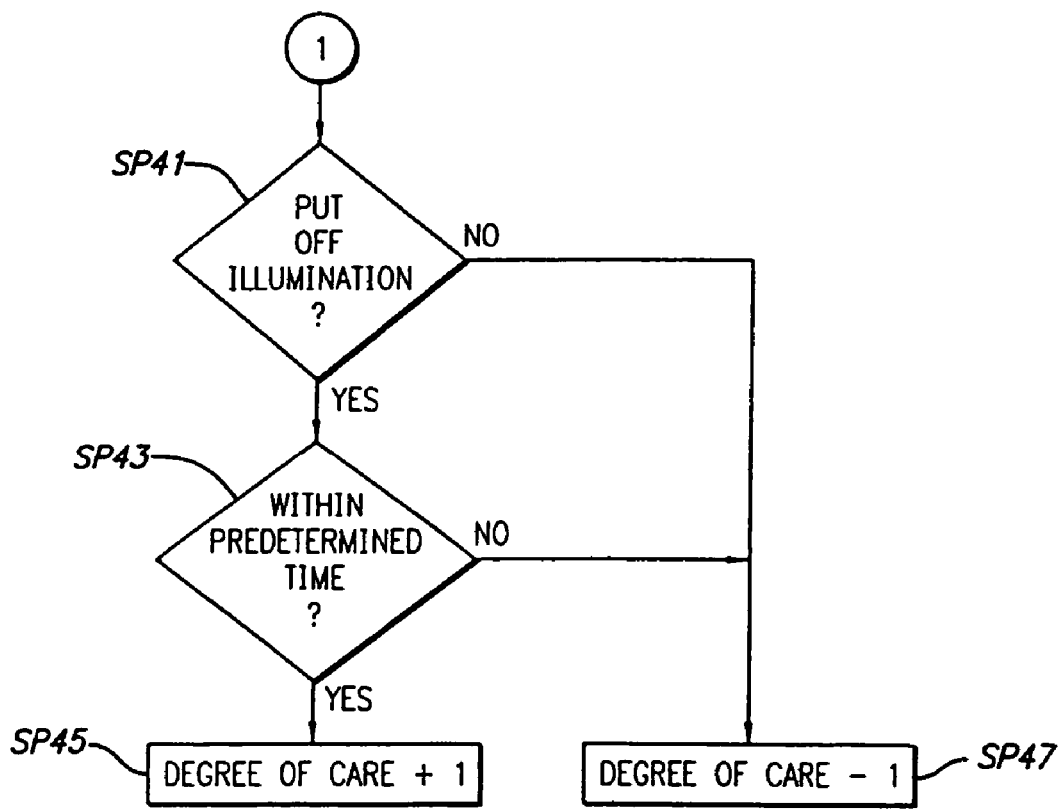
FIG. 7 is a flowchart showing the control treatment of the second growth stage in the simulation apparatus for breeding a virtual creature of FIG. 2.

Firstly, an explanation will be given of the total constitution of the simulation apparatus 1 for breeding a virtual creature in reference to FIG. 2 through FIG. 4.

As shown by FIG. 2, the apparatus main body ii is formed portable with the shape of a total thereof in an egg-like shape. A display unit 13 is installed at the central portion of the main body apparatus 11 and a plurality of key switches SW1, SW2 and SW3 are arranged at the lower side of the display unit 13.

The display unit 13 is constituted by an image display unit 15 for displaying character images of virtual creatures, a mark display unit 17 installed above the image display unit 15 and a mark display unit 19 installed below the image display unit 15. As shown by FIG. 3, the image display unit 15 is formed by a liquid crystal screen of horizontal 32 dots and vertical 16 dots.

A plurality of marks of a food mark 17a, an illumination mark 17b, a game mark 17c and an injection mark 17d are displayed in the mark display unit 17. When the food mark 17a is selectively displayed, the virtual creature can be fed with meal or sweet. Thereby, every time the virtual creature eats 1 cup of meal, a hungriness parameter is increased by +1. Also, every time the virtual creature eats 1 piece of sweet, a humor parameter is increased by +1. When the illumination mark 17b is selectively displayed, illumination of a room can be put off when the virtual creature takes a sleep. When the game mark 17c is selectively displayed, the player can play a game with the virtual creature. When, for example, the virtual creature wins by 3 times or more in 5 times of battles as a result of a game, a parameter is increased by +1. When the injection mark 17d is selectively displayed, injection can be administered if the virtual creature gets ill. Thereby, the virtual creature can be treated.

A plurality of marks of a rest room mark 19a, a check meter mark 19b, a discipline mark 19c and a call mark 19d are displayed in the mark display unit 19. When the rest room mark 19a is selectively displayed, if the virtual creature evacuates droppings, they can be cleaned by flushing them by water. When the check meter mark 19b is selectively displayed, respective values of age, weight, humor parameter, hungriness parameter and discipline degree of the virtual creature can be confirmed by a meter display. When the discipline mark 19c is selectively displayed, a discipline may be conducted in respect of a selfish call of the virtual creature requiring no emergency. The call mark 19d is a mark displaying a call from the virtual creature. The call mark 19d constitutes a portion of calling means whereby the virtual creature makes a call in the procedure of growing the virtual creature.

The key switch SW1 is a switch for selectively displaying a desired mark from the mark display units 17 and 19 and every time the key switch SW1 is pushed down, the food mark 17a, the illumination mark 17b, the game mark 17c, the injection mark 17d, the rest room mark 19a, the check meter mark 19b and the discipline mark 19c are switched and displayed in this order. The key switch SW2 is a switch for determining the selected mark. The key switch SW3 is a switch for canceling the displayed mark. The apparatus main body 11 includes a clock and the key switch SW1, SW2 and SW3 are used for adjusting a time of the included clock. The key switches SW1, SW2 and SW3 constitute portions of the inputting means for conducting a treatment in respect of a call from a virtual creature.

As calling means whereby the virtual creature makes a call in the procedure of growth of the virtual creature, CPU 23 and a buzzer buzzed by an instruction from CPU 23, a speaker, a winking light emitting element, LED or a pertinent mark display body is used. Also, the content of a call includes a content necessary for growing the virtual creature and a content that is selfish requiring no emergency.

Here, the content necessary for growing the virtual creature is needed, for example, in the case where a call is made for requesting a meal when the virtual creature gets hungry (a value of hungriness parameter is below a value of MAX). Also, the content is needed in the case where a call is made for requesting a game for improving the humor when the humor of the virtual creature is bad (a value of humor parameter is below a value of MAX). Also, the content is needed when a call is made for requesting to put off illumination such that the virtual creature can take a sleep.

The selfish content where no emergency is needed in respect of a call from the virtual creature concerns the case where a call is made even if the value of the hungriness parameter and the value of the humor parameter are both at values of MAX. Also, the selfish content concerns the case where the virtual creature does not take a meal after making a call even if the value of the hungriness parameter is below the value of MAX. Also, the selfish content concerns the case where the virtual creature does not play a game after making a call even if the value of the humor parameter is below the value of MAX.

A reset switch SW4 is installed at the back face of the apparatus main body 11. The simulation of growing the virtual creature can be restored to an initial setting by operating the reset switch SW4.

Next, an explanation will be given of the constitution of the circuit unit and a peripheral portion thereof integrated to the apparatus main body 11 in reference to FIG. 4 as follows.

The above-described display unit 13 is connected to a control apparatus 21. The control apparatus 21 is formed by one chip of an integrated circuit. The above-described key switches SW1, SW2, SW3 and the reset switch SW4 are connected to the control apparatus 21. Condensers CC1 through CC12, resistors RR1, RR2, RR4 and RR5 are connected to the control apparatus 21. A buzzer BZ1 is connected to the control apparatus 21 via the resistors RR4 and RR5 and an oscillator XL is connected thereto.

The control apparatus 21 includes a storing unit 22 for storing software programs and various control data in respect of the growth simulation for breeding and growing a virtual creature, CPU 23 for reading the software programs and the various control data stored in the storing unit 22 and executing various control processings based on the control data, working memories of the CPU 23 and the like. That is, the control apparatus 21 includes setting means for setting 1 or more of growth stages in accordance with growth of the virtual creature, the storing unit 22 for storing a plurality of kinds of grown virtual creatures having at least different appearances for each of the growth stages, calling means whereby a virtual creature makes a call in the procedure of growing the virtual creature and selecting means for selecting one grown virtual creature from the plurality of kinds of virtual creatures in consideration of the contents of treatments in respect of calls in the growth procedure until then when the virtual creature reaches one of the growth stages. The control apparatus 21 also includes such circuits as a drive circuit for driving a display unit 13, a buzzing circuit for buzzing the buzzer EZ1, a clock pulse forming circuit for forming clock pulses at predetermined periods of time based on the oscillation pulses from the oscillator XL, a clock circuit for outputting clock information based on the clock pulses and a timer circuit for outputting timer information based on the clock pulses.

Next, an explanation will be given of the operation in reference to FIG. 5 through FIG. 11 as follows.

Firstly, an explanation will be given of a main flow control in reference to FIG. 5. At step SP1 whether the reset switch SW4 is operated is determined and when the reset switch SW4 is operated, the operation proceeds to step SF3 and time setting is conducted by operating the key switches SW1, SW2 and SW3. The life time of a virtual creature is determined hereinafter based on this time. Accordingly, the virtual creature acts in accordance with a real time. For example, a life time where the virtual creature starts acting by rising from bed at 9 o'clock in the morning and retires to bed at 8 o'clock in the evening, is set. An initial screen is successively displayed at step SP5. Here, an image having, for example, a shape of an egg is displayed, the egg is cracked after a predetermined time period and a new born baby of a virtual creature of a character image KT1 in the first generation is born and displayed.

Next, treatments in respect of the first growth procedure are executed at step SP7. For example, a player takes care of the virtual creature by feeding meal or sweet by operating the key switches SW1, SW2 and SW3. Also, the player can conduct rest room cleaning or treatment of illness in respect of a call from the virtual creature.

Next, at step SP9, when approximately 60 minutes have elapsed since the virtual creature of the character image KT1 of the first generation was born, the virtual creature is changed into a virtual creature of a character image KT2 of a second generation and the operation proceeds to the second growth procedure. In the second growth procedure, the player takes care of the virtual creature in respect of a call with a content necessary for growing the virtual creature when a call is made from the virtual creature similar to the above-described first growth procedure. The player can also conduct a discipline in respect of a call with a selfish content from the virtual creature.

Successively, at step SP11, whether the virtual creature reaches a second growth stage is determined. When it is determined that the virtual creature does not reach the second growth stage at step SP11, the operation returns to step SP9 and conducts treatments of the above-described second growth procedure. When it is determined in step SP11 that the virtual creature reaches the second growth stage, the operation proceeds to step SP13.

At step SP13, one grown virtual creature is selected from a plurality of kinds of virtual creatures, that is, virtual creatures of character images KT3, KT4, KT5 and KT6 of a third generation in consideration of the contents of cares and disciplines in the second growth procedure.

For example, in the second growth procedure, if in the case where calls are made from the virtual creature, cares are not taken by 3 times or more in respect of calls with contents necessary for growing the virtual creature and disciplines are not made by 2 times or more in respect of calls with a selfish content from the virtual creature, a virtual creature of the character image KT6 is selected. The virtual creature of the character image KT6 is changed into a virtual creature of a third generation and grown thereafter.

Next, the operation proceeds to a third growth procedure at step SP15 and when a call is made from the virtual creature similar to the above-described second growth procedure, care can be taken in respect of a call with a content necessary for growing the virtual creature and discipline can be made in respect of a call with a selfish content from the virtual creature.

Successively, at step SP17, whether the virtual creature reaches the third growth stage is determined. When it is determined in step SP17 that the virtual creature does not reach the third growth stage, the operation returns to step SP15 again and the treatments of the third growth stage are conducted. When it is determined in step SP17 that the virtual creature reaches the third growth stage, the operation proceeds to step SP19.

At step SP19, one grown virtual creature is selected from a plurality of kinds of virtual creatures that is, from virtual creatures of character images KT7 through KT12 of a fourth generation in consideration of contents of cares and disciplines in the above-described third growth procedure.

For example, in the third growth procedure, when in the case where calls are made from the virtual creature cares are not taken by 3 times or more in respect of calls with a content necessary for growing the virtual creature and disciplines are not made by 6 times of more in respect of calls with a selfish content from the virtual creature, a virtual creature 2 of a character image KT1 is selected and the virtual creature 2 of the character image KT1 is changed into a virtual creature of the fourth generation and grown thereafter.

Further, when the reset switch SW4 is not operated at step SP1, the operation proceeds to step SP2 and whether the virtual creature is at the first growth procedure is determined. When it is determined in step SP2 that the virtual creature is at the first growth procedure, the operation proceeds to step SP7 and treatments of the first growth procedure are conducted. When it is determined in step SP2 that the virtual creature is not at the first growth stage, the operation proceeds to SP4 and whether the virtual creature is at the second growth procedure is determined. When it is determined at step SP4 that the virtual creature is at the second growth procedure, the operation proceeds to step SP9 and treatments of the second growth procedure are conducted. When it is determined at step SP4 that the virtual creature is not at the second growth procedure, the operation proceeds to step SP15 and treatments of the third growth procedure are conducted.

Next, a detailed explanation will be given of the operation in the second growth procedure in reference to FIG. 6 through FIG. 11 as follows.

Figure 6:
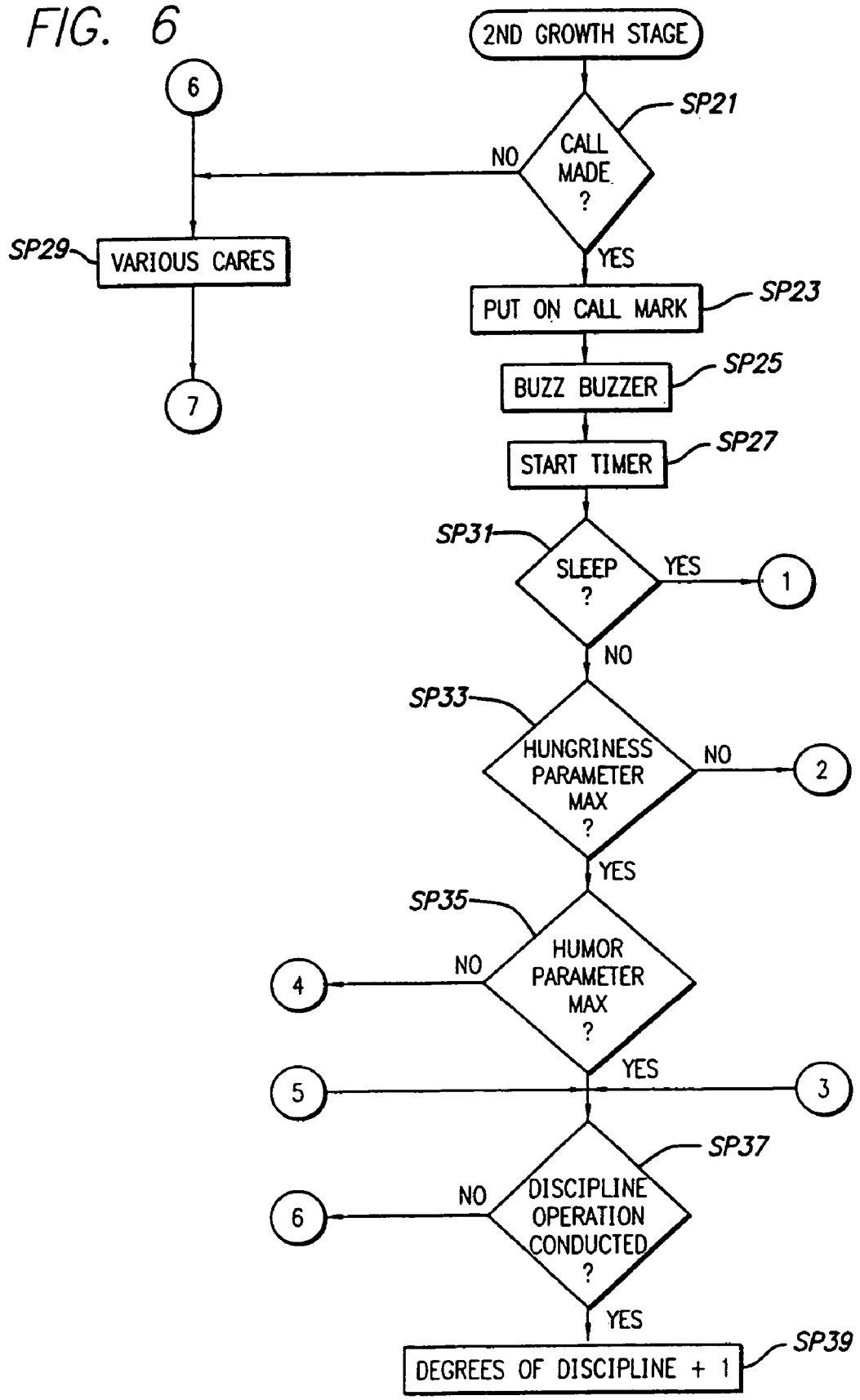
FIG. 6 is a flowchart showing a control treatment of a second growth stage in the simulation apparatus for breeding a virtual creature of FIG. 2.
Figure 8:
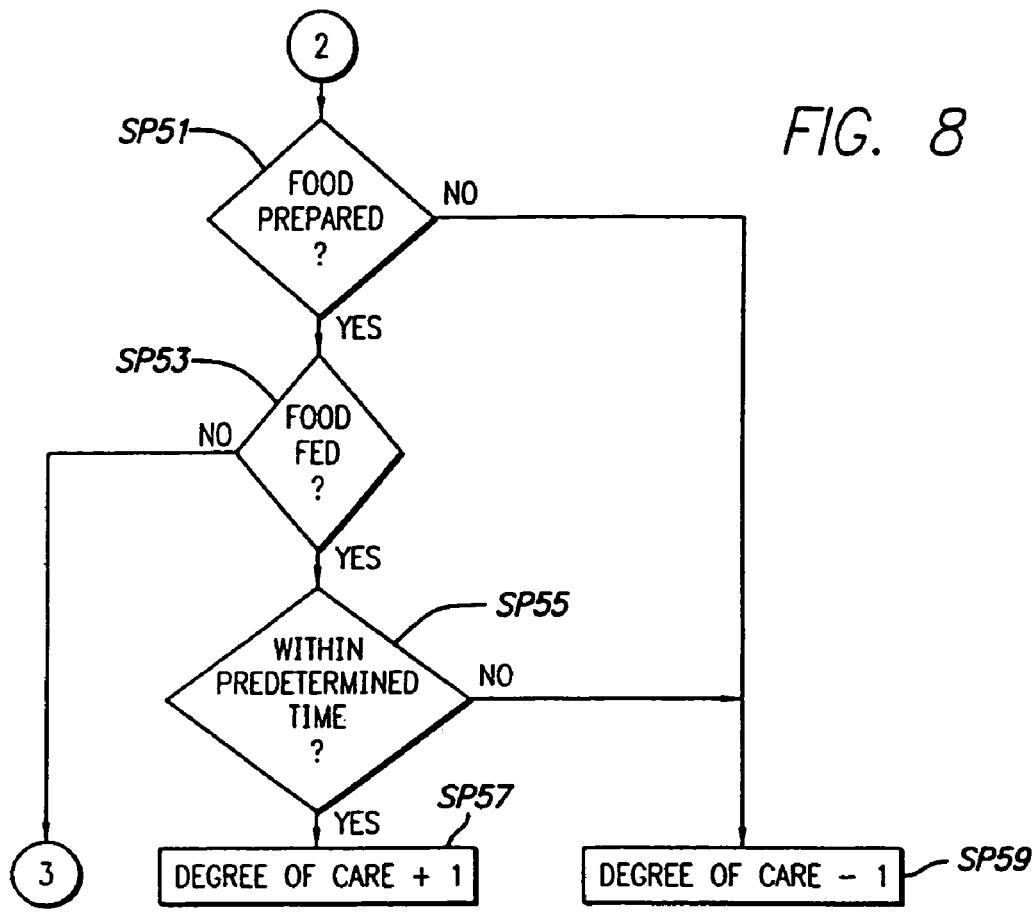
FIG. 8 is a flowchart showing the control treatment of the second growth stage in the simulation apparatus for breeding a virtual creature of FIG. 2.
Figure 9:
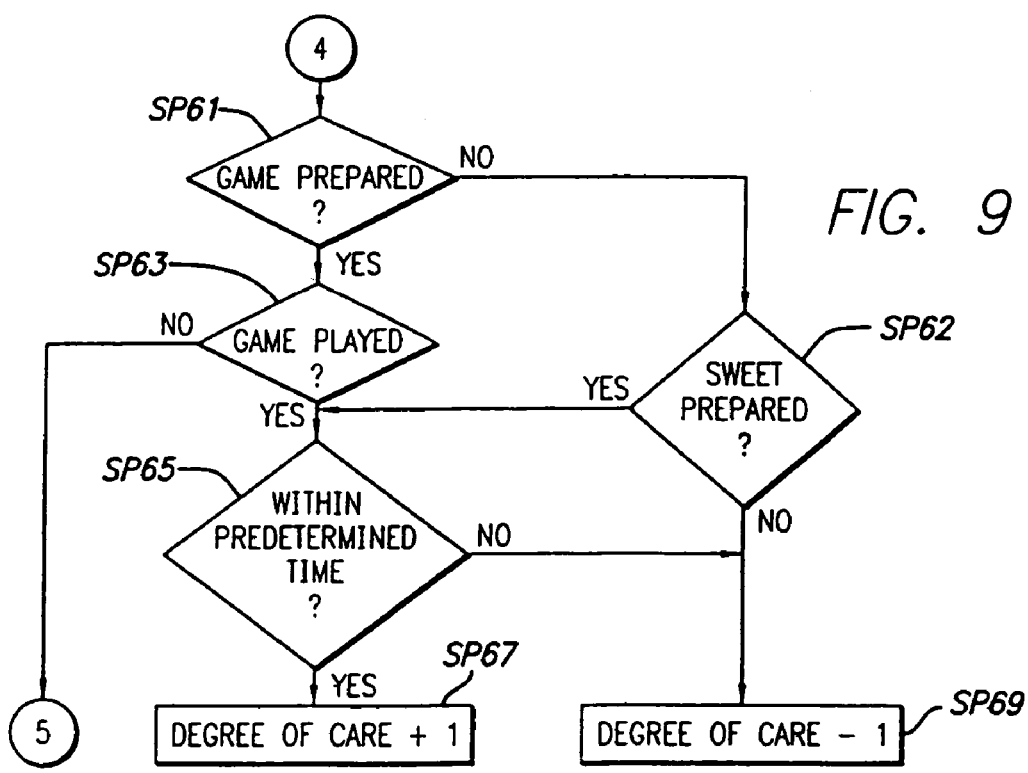
FIG. 9 is a flowchart showing the control treatment of the second growth stage in the simulation apparatus for breeding a virtual creature of FIG. 2.
Figure 10:
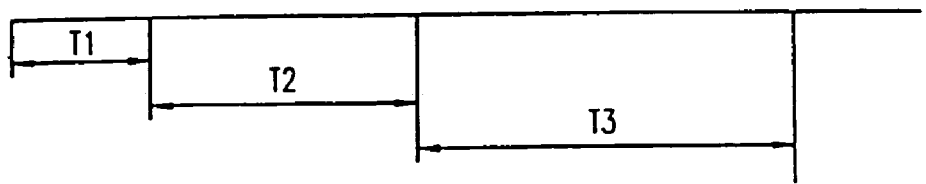
FIG. 10 is an explanatory view showing input reception times in the simulation apparatus for breeding a virtual creature of FIG. 2.

At step SP21 of FIG. 6, whether a call is made from the virtual creature is determined and when a call is made from the virtual creature, the operation proceeds to steps SP23 and SP25 where the call mark 19d is put on and at the same time the buzzer BZ1 is buzzed for a predetermined time Ti as shown by FIG. 10, for example, 3 seconds. Also, a timer is started simultaneously at step SP27 and the operation proceeds to step SP31.

Successively, at step SP31, whether the call from the virtual creature is for taking a sleep is determined. When it is determined in step SP31 that the call is made for taking a sleep, the operation proceeds to step SP41 of FIG. 7 via (1). In step SP41, whether the player put off illumination by operating the key switches SW1, SW2 and SW3 is determined, and when the illumination is put off, the operation proceeds to step SP43 and whether the time is within a predetermined time is determined. When the illumination is put off within a predetermined time T3 as illustrated by FIG. 10 has elapsed since the call was made from the virtual creature, for example, within 1 hour, a care has been made pertinently and the operation proceeds to step SP45 whereby a degree of care is increased by +1.

Conversely, when even if the call was made from the virtual creature, the care therefor has not been made or when the illumination is put off after elapsing the predetermined time T3 or more since the call was made from the virtual creature, for example, if 1 hour or more has been elapsed, the care has not been taken pertinently, the operation proceeds to step SP47 from step SP41 or SP43 whereby the degree of care is decreased by.

Referring again to FIG. 6, when it is determined at step SP31 that the call is not for taking a sleep, the operation proceeds to step SP33. In step SP33, whether a value of a hungriness parameter of the virtual creature is MAX is determined and when the value of the hungriness parameter is not MAX, the operation proceeds to step SP51 of FIG. 8 via (2). In step SP51, whether the player has prepared food by operating the key switches SW1, SW2 and SW3 is determined and when food has been prepared, the operation proceeds to step SP53. In step SP53, whether the virtual creature has eaten the above-described prepared food is determined, and if the virtual creature has eaten food, the operation proceeds to step SP55. At step SP55, whether the time is within a predetermined time is determined. If the virtual creature has eaten food in a predetermined time T2 as shown by FIG. 10 since the call was made from the virtual creature, for example, within 15 minutes, the care has been taken pertinently and the operation proceeds to step SP57 whereby the degree of care is increased by +1.

Conversely, when even if the call was made from the virtual creature, the care therefor has not been taken at all, or if even in the case where the care of food has been taken, the virtual creature is fed with food after elapsing the predetermined time T2 since the call was made from the virtual creature, for example, 15 minutes or more has elapsed, the care has not been taken pertinently and the operation proceeds to step SP59 from step SP51 or SP55 whereby the degree of care is decreased by 1.

Further, in the case where even if the player has prepared food in step SP53, the virtual creature has not eaten food, the operation proceeds to step SP37 from step SP53 via (3).

Here, a player conducts an operation in respect of a discipline by determining that the virtual creature is selfish since the virtual creature has not eaten food even if the value of the hungriness parameter of the virtual creature is not MAX. That is, the player selectively displays the discipline mark 19c by operating the key switches SW1, SW2 and SW3 by which a player can conduct the discipline in respect of the virtual creature. In step SP37, whether the operation in respect of a discipline has been conducted is determined and when the operation in respect of a discipline has been conducted, the operation proceeds to step SP39 whereby a degree of discipline is increased by +1.

As described above, in step SP33, whether the value of the hungriness parameter of the virtual creature is MAX is determined and when the value of the hungriness parameter is MAX, the operation proceeds to step SP35. At step SP35, whether a value of a humor parameter of the virtual creature is MAX is determined and when the value of the humor parameter is not MAX, the operation proceeds to step SP61 of FIG. 9 via (4). In step SP61, whether the player has prepared a game by operating the key switches SW1, SW2 and SW3 is determined and when a game has been prepared, the operation proceeds to step SP63. At step SP63 whether the virtual creature has played the above-described game is determined and when the virtual creature has played the game, the operation proceeds to step SP65. In step SP65, whether the time is within a predetermined time is determined. When the virtual creature has played the game within a predetermined time T2 as illustrated by FIG. 10 since a call was made from the virtual creature, for example, within 15 minutes, the care has been taken pertinently and the operation proceeds to step SP67 whereby a degree of care is increased by +1.

When the game has not been prepared in step SP61, the operation proceeds to step SP62. In step SP62, whether the player has prepared sweet by operating the key switches SW1, SW2 and SW3 is determined and when sweet has been prepared, the operation proceeds to step SP65. In step SP65 whether the time is within a predetermined time is determined similar to the above-described operation. When sweet has been prepared within the predetermined time T2 as illustrated by FIG. 10, since call was made from the virtual creature, for example, within 15 minutes, care has been taken pertinently and the operation proceeds to step SP67 whereby the degree of care is increased by +1.

Conversely, in the case where even if the call was made from the virtual creature, the care therefor has not been taken at all, or if even in the case where the care of a game has been taken, the game has not been played within the predetermined time T2 since the call was made from the virtual creature, for example, 15 minutes have elapsed, the care has not been made pertinently and the operation proceeds to step SP69 from step SP62 or 65 whereby the degree of care is decreased by 1.

Further, in the case where the virtual creature has not played the game at step SP63 even if the player prepared the game, the operation proceeds to step SP37 of FIG. 6 from step SP63 via (5).

Here, the player conducts an operation in respect of a discipline by determining that the virtual creature is selfish since the virtual creature has not played the game even if the value of the humor parameter of the virtual creature is not MAX. That is, the player can conduct a discipline in respect of the virtual creature by selectively displaying the discipline mark 19c by operating the key switches SW1, SW2 and SW3. In step SP37, whether the operation in respect of a discipline has been conducted is determined and when operation in respect of a discipline has been conducted, the operation proceeds to step SP39 whereby the degree of discipline is increased by +1.

Figure 5:
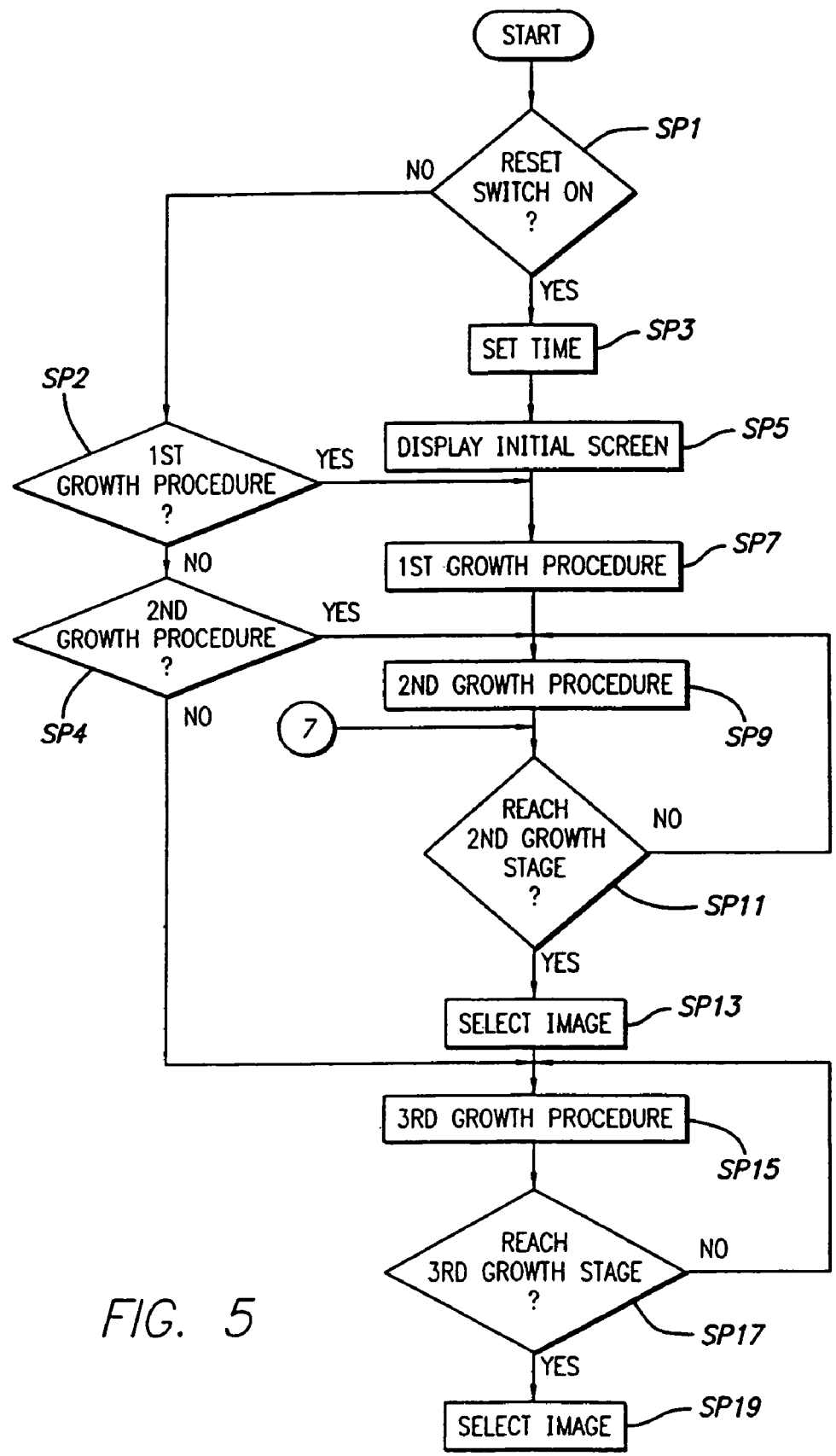
FIG. 5 is a flowchart showing a main control treatment in the simulation apparatus for breeding a virtual creature of FIG. 2.

When a call has not been made from the virtual creature at step SP21 or when the operation in respect of a discipline is not conducted at step SP37, the operation proceeds to step SP29 where various care treatments are conducted and thereafter, the operation returns to step SP11 of FIG. 5 via (7).

In this way, even if there is no call from a virtual creature, since the number of times of mistake is decreased as a result of reduced number of times of calls from the virtual creature by a player voluntarily taking care of the virtual creature with respect to its breeding by operating key switches SW1, SW2 and SW3, the virtual creature can be brought up to the one with good character.

For example, the player can feed the virtual creature determining that the virtual creature is hungry when a hungriness parameter is below a MAX value. In addition, the player can play a game for increasing humor of the virtual creature determining that the virtual creature is not in good humor if a value of a humor parameter is below a MAX value. Further, the payer can put out the light so that the virtual creature takes a sleep determining that the current time is a bedtime.

Incidentally, the above-described times T1, T2 and T3 can be set to pertinent values.

Next, an explanation will be given of a simulation apparatus 51 for breeding a virtual creature according to a second embodiment of the present invention in reference to FIG. 12 through FIG. 19 as follows.

Figure 13:
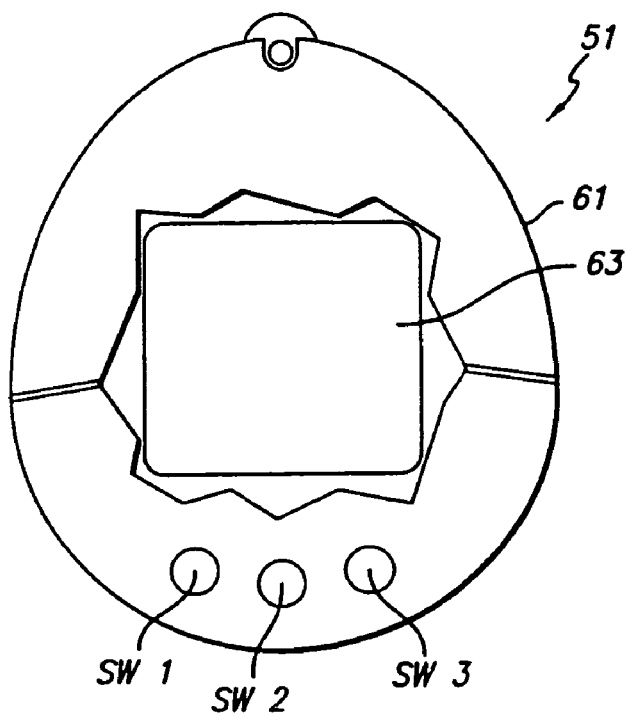
FIG. 13 is a plane view of the simulation apparatus for breeding a virtual creature illustrated by FIG. 12.
Figure 14:
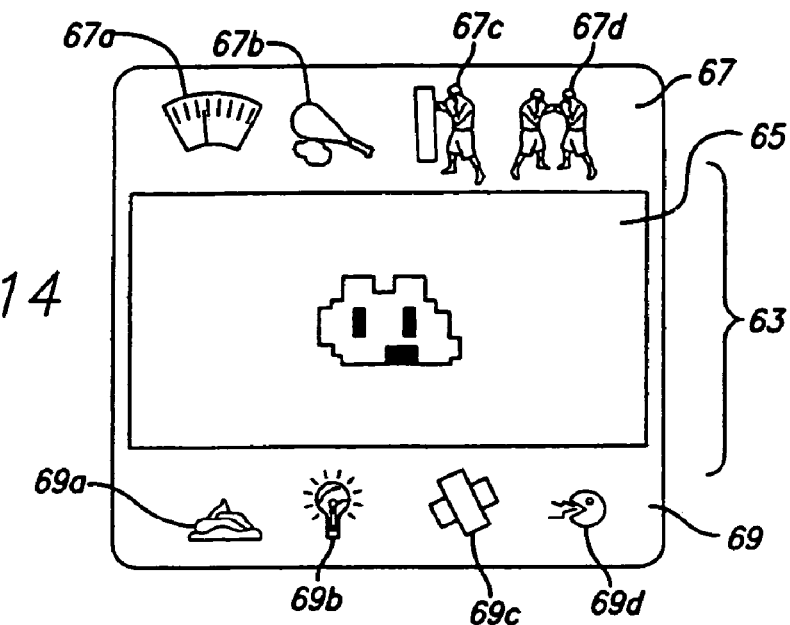
FIG. 14 is an explanatory view of a display unit of the simulation apparatus for breeding a virtual creature illustrated by FIG. 12.

A total of an apparatus main body 61 of the simulation apparatus 51 for breeding a virtual creature according to the second embodiment of the present invention, is formed in an egg-like shape, a display unit 63 is installed at the central portion as shown by FIGS. 13 and 14, a plurality of key switches SW1, SW2 and SW3 are arranged below the display unit 63.

The display unit 63 is constituted by an image display unit 65 for displaying character images, a mark display unit 67 installed above the image display unit 65 and a mark display unit 69 installed below the image display unit 65. As shown by FIG. 3, the image display unit 65 is formed by a liquid crystal screen of horizontal 32 dots×vertical 16 dots.

A plurality of marks of a status mark 67a, a food mark 67b, a training mark 67c and a battle mark 67d are displayed at the mark display unit 67. When the status mark 67a is selectively displayed, age, weight, hungriness degree (hungriness parameter), training degree (training parameter), basic physical strength (initial value of power) and battle achievement can be displayed successively. When the food mark 67b is selectively displayed, food or protein can be fed to the virtual creature. Every time the virtual creature is fed with food, the hungriness parameter is increased by +1 and every time the virtual creature is fed with protein, the hungriness parameter is increased by +2. When the training mark 67c is selectively displayed, the virtual creature can be made to conduct training. By conducting the training, the training parameter is increased by +1 and a rate of win in battling with other virtual creature, that is, a probability of winning the counterpart of battle is increased by +1 When the battle mark 67d is selectively displayed, other simulation apparatus for breeding a virtual creature is connected to the simulation apparatus for breeding a virtual creature of its own by which the both virtual creatures can be made to battle with each other.

Further, a plurality of marks of a rest room mark 69a, an illumination mark 69b, a treatment mark 69c and an alarm sign mark 69d are displayed in the mark display unit 69. When the rest room mark 69a is selectively displayed, if the virtual creature evacuates droppings, they can be cleaned by flushing them by water. When the illumination mark 69b is selectively displayed, illumination of a room can be put off if the virtual creature takes a sleep. When the treatment mark 69c is selectively displayed, wound of the virtual creature can be treated. The alarm sign mark 69d is a mark for displaying a call from the virtual creature. The call mark 69d constitutes a portion of calling means 56 whereby the virtual creature makes a call in the procedure of growing the virtual creature.

The key switch SW1 is a switch for selecting and displaying a desired mark in the mark display units 67 and 69. Every time the key switch SW1 is pushed down, the status mark 67a, the food mark 67b, the rest room mark 69a, the illumination mark 69b, the training mark 67c, the battle mark 67d and the treatment mark 69c are switched and displayed in this order. The key switch SW2 is a switch for determining a selected mark. The key switch SW3 is a switch for canceling a displayed mark. Even if there is no call from a virtual creature, since the number of times of mistake is decreased as a result of reduced number of times of calls from the virtual creature by a player voluntarily taking care of the virtual creature with respect to its breeding by operating key switches SW1, SW2 and SW3, the virtual creature can be brought up to the one with good character.

In this way, various kinds of cares and training can be conducted on the discretion of the player. For example, when the hungriness parameter has decreased to 1, the player can feed a virtual creature determining that the virtual creature is hungry. In addition, when determining that the current time has reached a bedtime, the player can put out the light in order to have a virtual creature take a sleep. Further, when a value of the training parameter has decreased to 1, the player can make the virtual creature to do training determining that the virtual creature needs training. An apparatus main body 61 includes a clock and key switches SW1, SW2 and SW3 are used for adjusting the time of the included clock.

The key switches SW1, SW2 and SW3 constitute a portion of inputting means for conducting a treatment in respect of a call from the virtual creature.

As calling means 56 whereby a virtual creature makes a call in the procedure of growing the virtual creature, a CPU and a buzzer, a speaker, a winking light emitting element, LED or a pertinent mark display unit operated by an instruction of the CPU are used. The content of the call includes a content necessary for growing the virtual creature and a content necessary for promoting a power.

The content necessary for growing the virtual creature concerns the case where a call for requesting food is made when the virtual creature gets hungry (when a value of hungriness parameter is reduced to 1). It also concerns the case where a call is made for requesting to put off illumination such that the virtual creature can take a sleep.

The content necessary for promoting a power concerns the case where a call for requesting a training is made when a value of a training parameter is reduced to 1.

A reset switch SW4 is installed on a back face of the apparatus main body 61. A growth simulation of the virtual creature can be returned to an initial setting by operating the reset switch SW4.

Next, an explanation will be given of the constitutions of a circuit portion and a peripheral portion thereof integrated to the apparatus main body 61 in reference to FIG. 15.

The above-described display unit 63 is connected to a control apparatus 71. The control apparatus 71 is formed by one chip of an integrated circuit. The above-described key switches SW1, SW2 and SW3 and the reset switch SW4 are connected to the control apparatus 71. Further, condensers CC1 through CC12, resistors RR1, RR2, RR4 and RR5 are connected to the control apparatus 71. A buzzer BZ1 is connected to the control apparatus 71 via the resistors RR4 and RR5 and an oscillator XL is connected thereto.

The control apparatus 71 is provided with a storing unit for storing software programs and various control data in respect of the growth simulation for breeding and growing the virtual creature. Also, the control apparatus 71 is provided with CPU for reading the software programs and the various control data stored in the storing unit and executing various control processings based on the control data, working memories of the CPU and the like. That is, the control apparatus 71 includes setting means 53 for setting growth stages of 1 or more in accordance with growth of the virtual creature, a storing unit 55 for storing a plurality of kinds of grown virtual creatures having at least different appearances at each of the growth stages, calling means 56 whereby the virtual creature makes a call in the procedure of growing the virtual creature, determining means for determining contents of treatments in respect of calls in the growth procedures until-then when virtual creature reaches one of the growth stages and selecting means 58 for selecting one grown virtual creature from a plurality of kinds of virtual creatures in consideration of a result of determination by the determining means.

Further, the control apparatus 71 includes a drive circuit for driving the display unit 63, a buzzing circuit for buzzing the buzzer BZ1, a clock pulse forming circuit for forming clock pulses at predetermined periods based on oscillation pulses from the oscillator XL, a clock circuit for outputting clock information based on the clock pulses and a timer circuit for outputting timer information based on the clock pulses.

Diodes DD1 and DD2 are connected to the control apparatus 71 via a resistor RR6. A communication terminal TA1 is drawn from a connection point of the resistor RR6 and the diodes DD1 and DD2. The communication terminal TA1 and a grounding terminal TA2 constitute connecting means 52 for connecting the simulation apparatus to other simulation apparatus via the communication terminal TA1 and the grounding terminal TA2. Furthermore, the control apparatus 71 includes warring means 54 for making a war based on battle data from the other simulation apparatus inputted via the connecting means 52 and battle data of its own and win or lose determining means 59 for determining win or lose of the war.

Next, an explanation will be given of the operation of the second embodiment according to the present invention in reference to FIG. 16 through FIG. 19.

Figure 16:
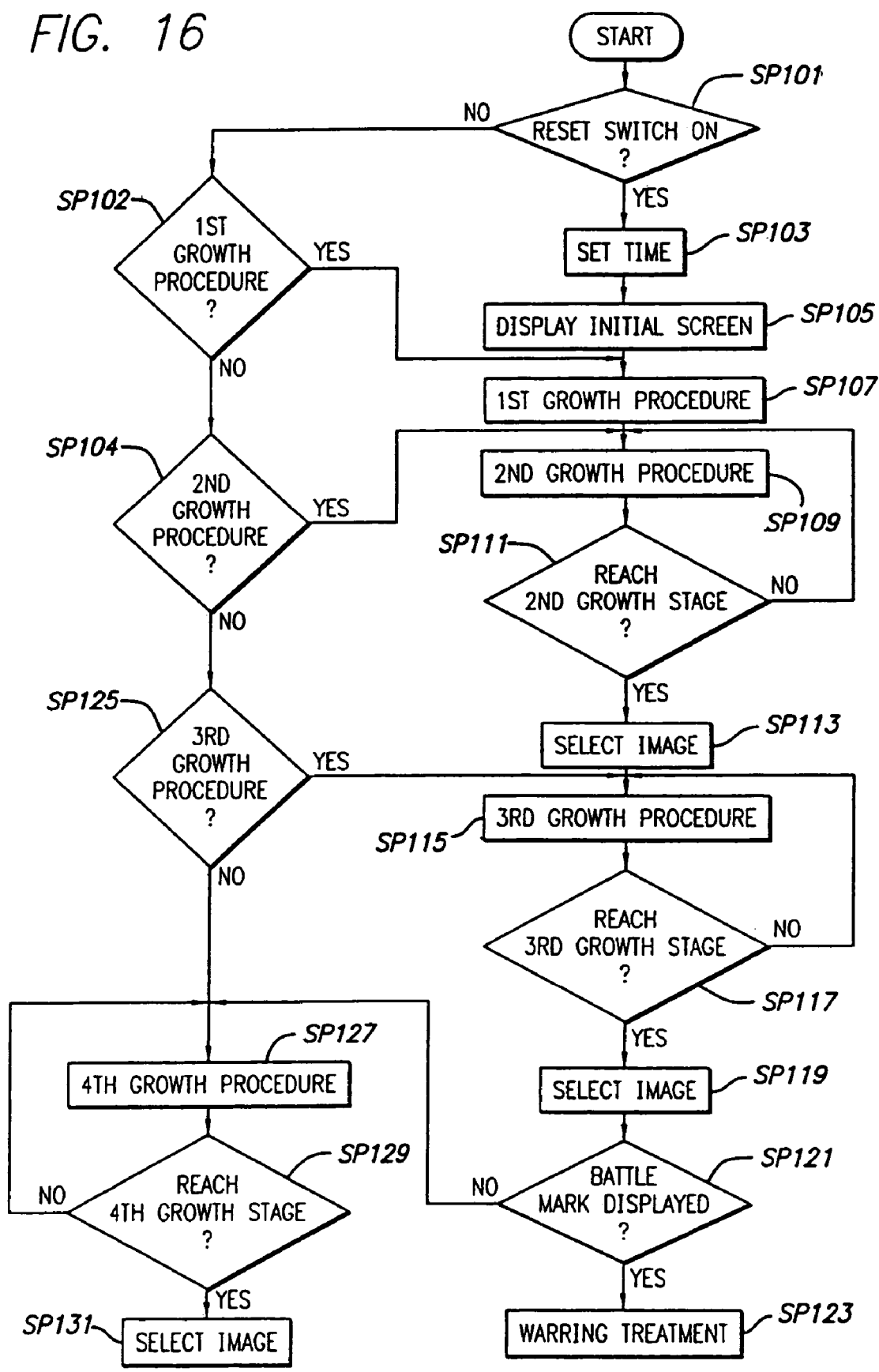
FIG. 16 is a flowchart showing a main control treatment in the simulation apparatus for breeding a virtual creature illustrated by FIG. 12.

An explanation will firstly given to a main control processing in reference to FIG. 16. At step SF101, whether the-reset switch SW4 is operated is determined and when the reset switch SW4 is operated, the operation proceeds to step SF103 where a time is set by operating the key switches SW1, SW2 and SW3. A life time of the virtual creature hereinafter is determined based on the time. Accordingly, the virtual creature acts in accordance with a real time. For example, a life time where the virtual creature starts acting by rising from bed at 9 o'clock in the morning and retires to bed at 8 o'clock in the evening is set. Successively, at step SF105, an initial screen is displayed. Here, for example, an image having an egg-like shape is displayed, the egg is cracked after a predetermined time and a new born baby of a virtual creature of a character image Ni of a first generation is born and displayed.

Next, a treatment concerning a first growth procedure is executed at step SF107. For example, a player can take care of the virtual creature by cleaning rest room or treating wound by operating the key switches SW1, SW2 and SW3. Also, the player can feed food and put off illumination in respect of a call from the virtual creature.

Next, at step SF109, when approximately 60 minutes have elapsed since the virtual creature of the character image Ni of the first generation was born, it is changed into a virtual creature of a character image N2 of the second generation and the operation proceeds to a second growth procedure. In the second growth procedure, the player takes care of the virtual creature when a call is made from the virtual creature or at the intention of the player similar to the above-described first growth procedure.

Successively, whether the virtual creature reaches a second growth stage is determined in step SF111. When it is determined in step SF111 that the virtual creature does not reach the second growth stage, the operation returns to step SF109 again and the above-described treatments of the second growth stage are executed. When it is determined in step SF111 that the virtual creature reaches the second growth stage, the operation proceeds to step SF113.

At step SF113, one grown virtual creature is selected from a plurality of kinds of virtual creatures, that is, virtual creatures of character images X and Y of a third generation in consideration of contents of cares at the above-described second growth procedure.

For example, if in the second growth procedure, in the case where calls were made from the virtual creature, regular cares were taken such that the cares in respect of the calls were not taken by 4 time or less and the cares were taken since the alarm sign mark 69*d* had been put on, the character image X is selected and the character image X is grown thereafter as the virtual creature of the third generation.

Next, the operation proceeds to the third growth procedure at step SF115 where cares and trainings similar to those in the above-described second growth procedure can be conducted.

Successively, whether the virtual creature reaches a third growth stage is determined in step SF117. When it is determined in step SF117 that the virtual creature does not reach the third growth stage, the operation returns to step SF115 again and the above-described treatments of the third growth procedure are conducted.

Also, when it is determined in step SF117 that the virtual creature& reaches the third growth stage, the operation proceeds to step SF119.

At step SF119, one grown virtual creature is selected from a plurality of kinds of virtual creatures, that is, character images A1, A2, P1, P2, C1, C2 and D in consideration of the contents of cares in the above-described third growth procedure.

For example, if in the third growth procedure, regular cares were taken, a number of trainings was 5 or more and 15 or less and a number of full stomach and hindrance of sleep was 2 or less, the character image A1 is selected, and the character image A1 is grown thereafter as the virtual creature of the third generation.

Successively, whether the battle mark 67*d* is displayed is determined in step SF121 and when the battle mark 67*d* is displayed, the operation proceeds to step SF123 where a warring treatment is executed.

Further, if the reset switch SW4 is not operated in step SF101, the operation proceeds to step SF102 and whether the virtual creature is in the first growth procedure is determined. When it is determined in step SF102 that the virtual creature is in the first growth procedure, the operation proceeds to step SF107 and treatments of the first growth procedure are conducted. When it is determined in step SF102 that the virtual creature is not in the first growth procedure, the operation proceeds to step SF104 and whether the virtual creature is in the second growth procedure is determined. When it is determined in step SF104 that the virtual creature is in the second growth procedure, the operation proceeds to step SF109 and treatments of the second growth procedure are conducted. When it is determined in step SF104 that the virtual creature is not in the second growth procedure, the operation proceeds to step SF125 and whether the virtual creature is in the third growth procedure is determined. When it is determined in step SF125 that the virtual creature is in the third growth procedure, the operation proceeds to step SF115 and treatments of the third growth procedure are conducted. When it is determined in step SF125 that the virtual creature is not in the third growth procedure, the operation proceeds to step SF127 and treatments of a fourth growth procedure are conducted.

Also in the case where the battle mark 67*d* is not displayed in step SF121, the operation proceeds to step SF127 and treatments of the fourth growth procedure are conducted. Normally, most of the character images die since they reach average spans of lives in the fourth growth procedure, however, the operation may proceed to the following steps under specific conditions.

In step 129, whether the virtual creature reaches the fourth growth stage is determined. When it is determined in step SF129 that the virtual creature does not reach the fourth growth stage, the operation returns to step SF127 again and the above-described treatments of the fourth growth procedure are conducted. When it is determined in step SF129 that the virtual creature reaches the fourth growth stage, the operation proceeds to step SF131.

In step SF131, one grown virtual creature is selected from a plurality of kinds of virtual creatures, that is, character images S1, S2 and S3 of a fifth generation is selected in consideration of the contents of cares in the above-described fourth growth procedure.

Next, a detailed explanation will be given of the warring treatment in the above-described step SF123 in reference to FIG. 17.

Figure 17:
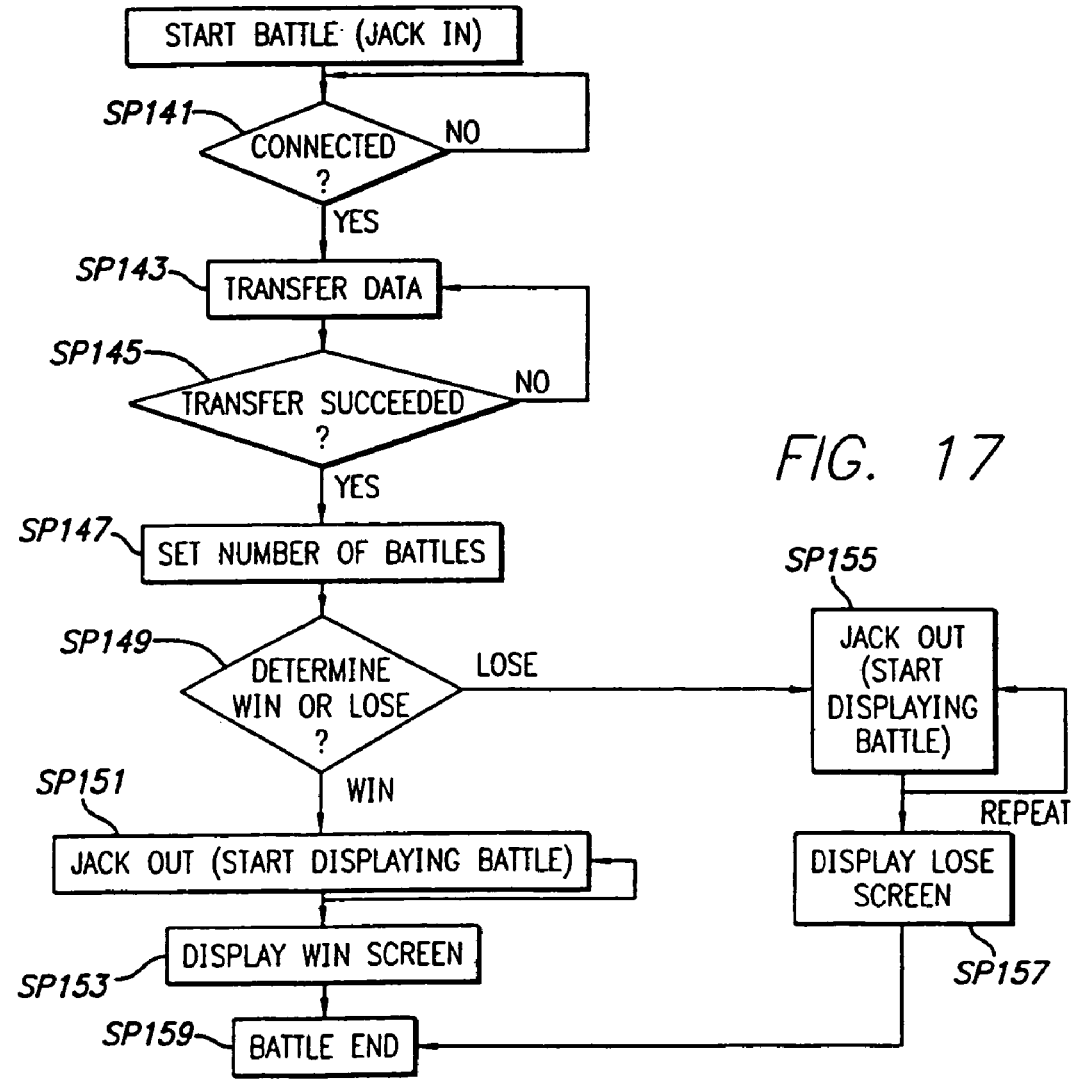
FIG. 17 is a flowchart showing a warring treatment in the simulation apparatus for breeding a virtual creature illustrated by FIG. 12.

In step SF141 of FIG. 17, whether the simulation apparatuses for breeding virtual creatures on the both sides which are about to start a war are connected to each other via the communication terminals TA1 and TA2, that is, whether the apparatuses are jacked in is determined. When the both simulation apparatuses for breeding virtual creatures are connected, the operation proceeds to step SF143 and data of the virtual creatures of their own are transferred to the counter apparatuses. At step SF145, whether data have been firmly transferred is determined and when the data have firmly been transferred, the operation proceeds to step SF147 and a number of battles is set. Here, when both warring powers are at an equilibrium, a large number of battles is set. Successively, at step SF149, win or lose of the battle is determined.

In respect of the determination of win or lose in this case, the win or lose is determined by calculating rates of win of the respective parties in consideration of a number of trainings, a number of wounds, a number of fed proteins and the like of the both virtual creatures.

In respect of the simulation apparatus for breeding a virtual creature which is determined to win as a result of the above-described determination of win or lose, the operation proceeds to steps SF151 and 153 and after jacking out the apparatuses, warring screens are displayed by a number of the battles and thereafter, a screen of win is displayed. Also, in respect of the simulation apparatus for breeding a virtual creature which is determined to lose as a result of the determination of win or lose, the operation proceeds to steps SF155 and 157, and after jacking out the apparatuses, warring screens are displayed by a number of the battles and thereafter, a lose screen is displayed.

As has been explained, according to the invention of this application, the apparatus is provided with the mark display units for displaying a plurality of kinds of treatments in respect of breeding a virtual creature individually by marks by which a corresponding treatment can simply and firmly inputted by selecting a specific mark from the plurality of marks by the inputting means.

The apparatus is provided with the storing unit for storing the control data in respect of breeding a virtual creature and is constituted such that when a treatment in respect of breeding a virtual creature is inputted from the inputting means, the control data in correspondence thereto is read from the storing unit and the control processing in respect of breeding the virtual creature is conducted based on the read control data and the fostered virtual creature is displayed by the virtual creature display unit. Accordingly, a player diligently deals with the breeding of the virtual creature as if the player actually raised an actual creature by which a tasteful simulation apparatus for breeding a virtual creature can be provided.

Further, when the player actually deals with breeding of a virtual creature as if the player actually raised an actual creature, a gentle mind in respect of creatures can be fostered by which a simulation apparatus for breeding a virtual creature that is appropriate in view of education can be provided.

According to the first aspect of the present invention, the apparatus is provided with the setting means for setting 1 or more of growth stages in correspondence with the growth of the virtual creature and the storing unit for storing a plurality of kinds of grown virtual creatures having at least different appearances at each of the growth stages. Further, the apparatus is provided with the inputting means for conducting treatments in respect of breeding the virtual creature in the procedure of growth of the virtual creature and accordingly, the player conducts a treatment with respect to the virtual creature in a screen by which the virtual creature can be grown while disciplining the virtual creature.

That is, even if there is no call from a virtual creature, since the number of times of mistake is decreased as a result of reduced number of times of calls from the virtual creature by a player voluntarily taking care of the virtual creature with respect to its breeding by operating key switches SW1, SW2 and SW3, there is an effect that the virtual creature can be brought up to the one with good character.

Further, the apparatus is constituted such that when the virtual creature reaches one of the growth stages, one grown virtual creature is selected from a plurality of kinds of virtual creatures in consideration of the contents of treatments in respect of breeding the virtual creature in the growth procedure until then. Accordingly, the player diligently deals with breeding the virtual creature as if the player raised an actual creature and can grow the virtual creature into virtual creatures having different appearances in accordance with the degree of care by the player by which a tasteful simulation apparatus for breeding a virtual creature can be provided.

Also, when the player diligently deals with breeding a virtual creature as if the player raised an actual creature, a gentle mind in respect of creatures can be fostered by which a simulation apparatus for breeding a virtual creature that is appropriate in view of education can be provided.

According to the second aspect of the present invention, the apparatus is provided with the storing unit for storing a plurality of kinds of grown virtual creatures having different appearances and personalities at each of the growth stages, the inputting means having a means for taking care of the virtual creature with the content necessary for growing the virtual creature and a means for conducting a discipline. Therefore, the virtual creature can be grown while disciplining the virtual creature.

The apparatus is constituted such that when the virtual creature reaches a certain growth stage, one grown virtual creature is selected from a plurality of kinds of virtual creatures in consideration of the contents of treatments in respect of breeding the virtual creature in the growth procedure until then, that is, the contents of cares and disciplines. Accordingly, when the player diligently takes care of the virtual creature and disciplines pertinently the virtual creature, a virtual creature having a good personality is selected from the plurality of kinds of virtual creatures and the player can grow the virtual creature into an imaginary having a good personality or a virtual creature having a bad personality in accordance with the degree of care of a player by which a tasteful simulation apparatus for breeding a virtual creature can be provided.

In this way, the virtual creature is changed into an unexpected virtual creature depending on the degree of care and discipline of the player and accordingly, a tasteful simulation apparatus for breeding a virtual creature can be provided.

The player diligently deals with breeding a virtual creature as if the player raised an actual creature and therefore, a gentle mind in respect of creatures can be fostered by which a simulation apparatus for breeding a virtual creature that is appropriate also in view of education can be provided.

According to the third aspect of the present invention, the apparatus is provided with the setting means for setting 1 or more of the growth stages in accordance with the growth of the virtual creature and the storing unit for storing a plurality of kinds of grown virtual creatures having at least different appearances at each of the growth stages. The apparatus is also provided with the inputting means for inputting treatments in respect of breeding the virtual creature in the procedure of growing the virtual creature, and the selecting means for selecting one grown virtual creature from the plurality of kinds of virtual creatures in consideration of the contents of treatments in respect of breeding the virtual creature in the growth procedure until then, when the virtual creature reaches one of the growth stages. Also, the apparatus is provided with the connecting means for electrically connecting the simulation apparatus to other simulation apparatus for breeding a virtual creature, the warring means for making a war based on the battle data from the other simulation apparatus for breeding a virtual creature-that is inputted via the connecting means and the battle data of its own, and the win or lose determining means for determining win or lose of the war.

In this way grown virtual creatures can be made to war easily and the win or lose is automatically determined and therefore, the interesting degree is multiplied.

Further, the player can grow the virtual creature as if the player actually raised an actual creature by which a tasteful simulation apparatus for breeding a virtual creature can be provided.

According to the fourth aspect of the present invention, the apparatus is provided with the storing unit for storing a plurality of kinds of grown virtual creatures having different appearances and personalities at each of the growth stages, the storing unit stores a plurality of kinds of grown virtual creatures having different appearances and powers at each of the growth stages.

Further, the apparatus is provided with the inputting means for conducting a treatment in respect of breeding a virtual creature at the procedure of growing the virtual creature. The inputting means is provided with a means for taking care of the virtual creature with the content necessary for growing the virtual creature and a means for conducting a training with the content necessary for promoting a power and when the virtual creature reaches one of the growth stages, one grown virtual creature is selected from a plurality of kinds of virtual creatures in consideration of the contents of cares and trainings in the growth procedure until then. Accordingly, the player can grow the virtual creature into a virtual creature having a strong power in accordance with the degree of care of the player by which a tasteful simulation apparatus for breeding a virtual creature can be provided.

What is claimed is:

1. A simulation apparatus for breeding a virtual creature comprising:
    inputting means for inputting treatments in respect of breeding the virtual creature;
    a storing unit for storing a control data in respect of breeding the virtual creature;
    a control unit whereby when one of the treatments in respect of breeding the virtual creature is inputted from the inputting means, the control data in correspondence with the treatment is read from the storing unit and a control processing in respect of breeding the virtual creature is conducted based on the read control data; and
    a virtual creature display unit for displaying the fostered virtual creature;
    wherein the control unit is provided with setting means for setting one or more of growth stages in accordance with growing the virtual creature;
    wherein the storing unit stores a plurality of kinds of virtual creatures having at least different appearances at each of the growth stages, which is set with a frequency of calls;
    wherein the control unit is provided with calling means for indicating a call necessary for growing the virtual creature and a call requiring no emergency based on the frequency of calls with which each virtual creatures is set;
    wherein the inputting means is provided with a means for taking care of the virtual creature in response to the call necessary for growing the virtual creature and a means for disciplining the virtual creature in response to the call requiring no emergency;
    wherein the control unit is provided with determining means for determining contents of cares input by means for taking care of the virtual creature and disciplines input by means for disciplining the virtual creature in the growth procedure until then when the virtual creature reaches one of the growth stages;
    wherein the control unit is provided with selecting means for selecting one of the virtual creatures from the stored plurality of kinds of virtual creatures, which selects the virtual creature set with the relatively low frequency of the call when a result of a determination by the determining means is that a player diligently takes care of the virtual creature and conducts pertinent discipline therefor, and selects the virtual creature set with the relatively high frequency of the call when a result of a determination by the determining means is that the player does not diligently take care of the virtual creature and does not conduct pertinent discipline therefor; and
    wherein the control unit is provided with changing means for changing the virtual creature which has reached the one of the growth stages into the selected one of the virtual creatures.

2. A simulation apparatus for breeding a virtual creature comprising:
    inputting means for inputting treatments in respect of breeding a virtual creature;
    a storing unit for storing a control data in respect of breeding the virtual creature;
    a control unit whereby when one of the treatments in respect of breeding the virtual creature is inputted from the inputting means, the control data corresponding to the one of the treatments is read from the storing unit and a control processing in respect of breeding the virtual creature is conducted based on the read control data; and
    a virtual creature display unit for displaying the fostered virtual creature;
    wherein the control unit is provided with setting means for setting one or more of growth stages in accordance with growing the virtual creature;
    wherein the storing units stores a plurality of kinds of virtual creatures having at least different appearances at each of the growth stages, which is set with a frequency of calls;
    wherein the control unit is provided with calling means for indicating a call necessary for growing the virtual creature based on the frequency of calls with which each virtual creature is set;
    wherein the inputting means is provided with a means for taking care of the virtual creature in response to the call necessary for growing the virtual creature;
    wherein the control unit is provided with determining means for determining contents of cares input by means for taking care of the virtual creature in a growth procedure until then when the virtual creature reaches one of the growth stages;
    wherein the control unit is provided with selecting means for selecting one of the virtual creatures from the stored plurality of kinds of virtual creatures, which selects the virtual creature set with the relatively low frequency of the call when a result of a determination by the determining means is that a player diligently takes care of the virtual creature, and selects the virtual creature set with the relatively high frequency of the call when a result of a determination by the determining means is that the player does not diligently take care of the virtual creature;
    wherein the control unit is provided with changing means for changing the virtual creature which has reached one of the growth stages into the selected one of the virtual creatures and further comprising:

connecting means for electrically connecting the simulation apparatus for breeding the virtual creature to another simulation apparatus for breeding a virtual creature;

wherein the control unit is provided with warring means for making a war based on a battle data from the other simulation apparatus for breeding a virtual creature inputted via the connecting means and a battle data of the simulation apparatus for breeding the virtual creature; and wherein the control unit is provided with win or lose determining means for determining win or lose the war.

3. The simulation apparatus for breeding a virtual creature according to claim 2;

wherein the storing unit stores a plurality of kinds of virtual creatures having different powers at each of the growth stages;

wherein the inputting means includes a means for conducting a training with the content necessary for promoting the power; and wherein the determining means determines a degree of the training.

* * * * *